(12) United States Patent
Nakahara et al.

(10) Patent No.: US 8,975,645 B2
(45) Date of Patent: Mar. 10, 2015

(54) OPTICAL FILTER

(71) Applicant: Rohm Co., Ltd., Kyoto (JP)

(72) Inventors: Ken Nakahara, Kyoto (JP); Shunsuke Akasaka, Kyoto (JP); Koki Sakamoto, Kyoto (JP); Tetsuo Fujii, Kyoto (JP); Shunsuke Furuse, Kyoto (JP); Soichiro Arimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/078,610

(22) Filed: Nov. 13, 2013

(65) Prior Publication Data
US 2014/0071525 A1 Mar. 13, 2014

Related U.S. Application Data

(62) Division of application No. 13/274,289, filed on Oct. 14, 2011, now Pat. No. 8,610,133.

(30) Foreign Application Priority Data

Oct. 14, 2010 (JP) ................................. 2010-231447
Mar. 29, 2011 (JP) ................................. 2011-071987
Oct. 7, 2011 (JP) ................................. 2011-222770

(51) Int. Cl.
H01L 21/44 (2006.01)
G01J 1/16 (2006.01)
G02B 5/28 (2006.01)
(Continued)

(52) U.S. Cl.
CPC .............. *G02B 5/208* (2013.01); *G01J 1/1626* (2013.01); *G02B 5/285* (2013.01); *G01J 1/429* (2013.01)

USPC .. 257/80; 257/89; 257/E31.027; 257/E31.065

(58) Field of Classification Search
CPC . G01N 11/08; G01N 33/2888; G02B 5/2855; G01F 1/7086
USPC ....................... 257/80, 89, E31.027, E31.065
See application file for complete search history.

(56) References Cited

U.S. PATENT DOCUMENTS 4,068,252 A    1/1978  Lebailly
4,297,142 A   10/1981  Ritze
4,741,963 A    5/1988  Wada et al.
(Continued)

FOREIGN PATENT DOCUMENTS

JP    2002-164565 A    6/2002
JP    2006-318947 A   11/2006
(Continued)

Primary Examiner — Michael Lebentritt
(74) Attorney, Agent, or Firm — Rabin & Berdo, P.C.

(57) ABSTRACT

Two light receiving elements are formed on a support substrate. A first light receiving element is formed of a p-type layer, an n-type layer, a light absorption semiconductor layer, an anode electrode, a cathode electrode, a protection film, etc. A second light receiving element is formed of a p-type layer, an n-type layer, a transmissive film, an anode electrode, a cathode electrode, a protection film, etc. The light absorption semiconductor layer absorbs light in a wavelength range λ and disposed closer to the light receiving surface than is the pn junction region. The transmissive film has no light absorption range and disposed closer to the light receiving surface than is the pn junction region. The amount of light in the wavelength range λ is measured through computation using a detection signal from the first light receiving element and a detection signal from the second light receiving element.

7 Claims, 21 Drawing Sheets

(51) Int. Cl.
  *G02B 5/20* (2006.01)
  *G01J 1/42* (2006.01)

(56) References Cited

U.S. PATENT DOCUMENTS

| | | |
|---|---|---|
| 5,272,364 A | 12/1993 | Hironaka |
| 6,013,983 A | 1/2000 | Asano et al. |
| 1,022,019 A1 | 9/2011 | Flood |
| 8,610,133 B2 * | 12/2013 | Nakahara et al. ............ 257/80 |
| 2001/0052566 A1 | 12/2001 | Hwang et al. |
| 2002/0117667 A1 | 8/2002 | Sugawara et al. |
| 2002/0135281 A1 | 9/2002 | Goda et al. |
| 2008/0251794 A1 | 10/2008 | Koda et al. |
| 2011/0180688 A1 | 7/2011 | Nakahara |
| 2011/0197948 A1 | 8/2011 | Kobayashi et al. |
| 2012/0048357 A1 | 3/2012 | Hayase et al. |

FOREIGN PATENT DOCUMENTS

| | | |
|---|---|---|
| JP | 2007-067331 A | 3/2007 |
| JP | 2007-305868 A | 11/2007 |
| JP | 2009-158570 A | 7/2009 |
| JP | 2009-158928 A | 7/2009 |

* cited by examiner

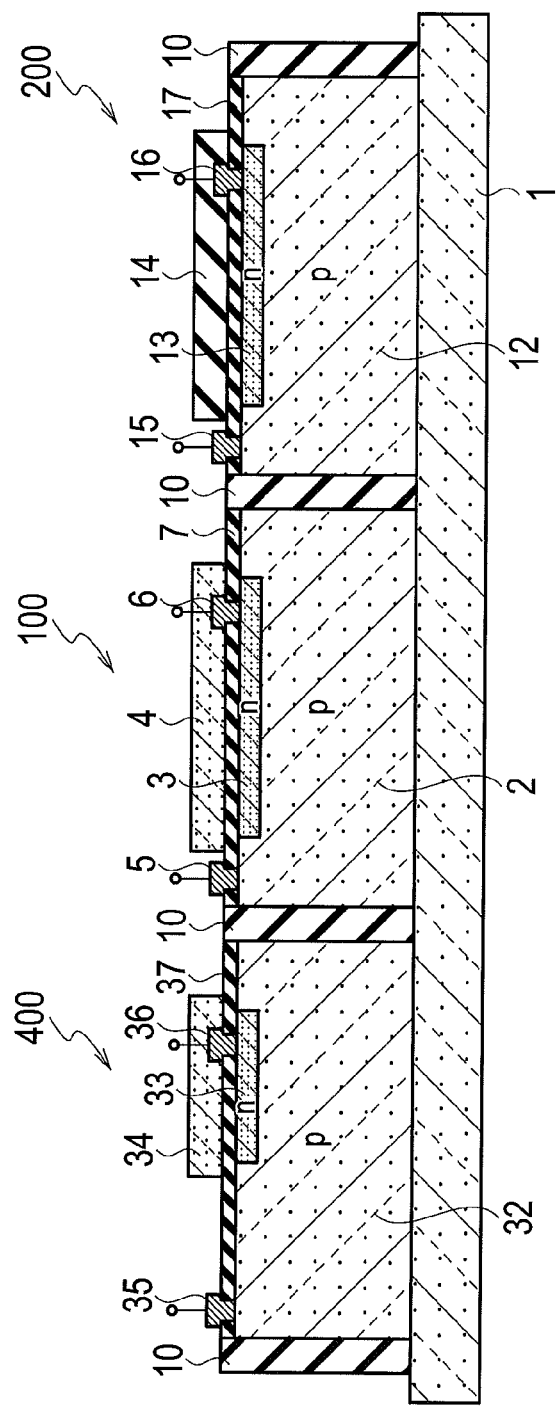

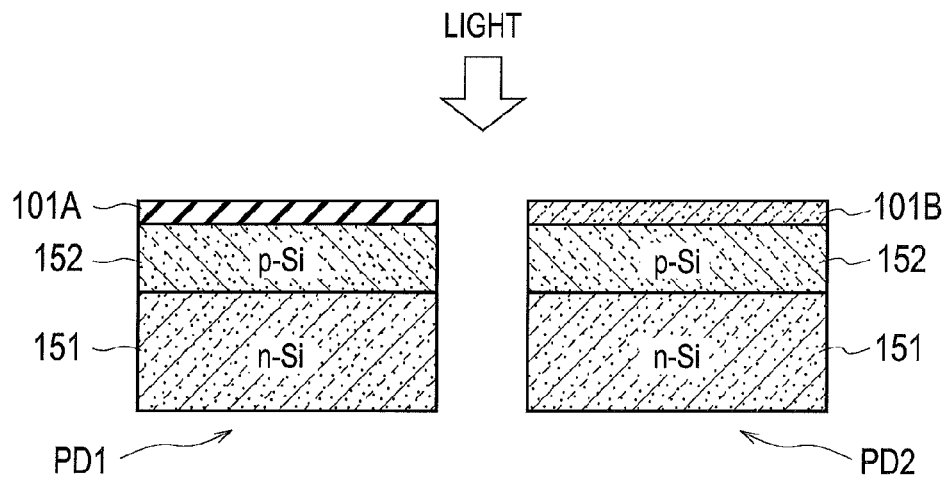
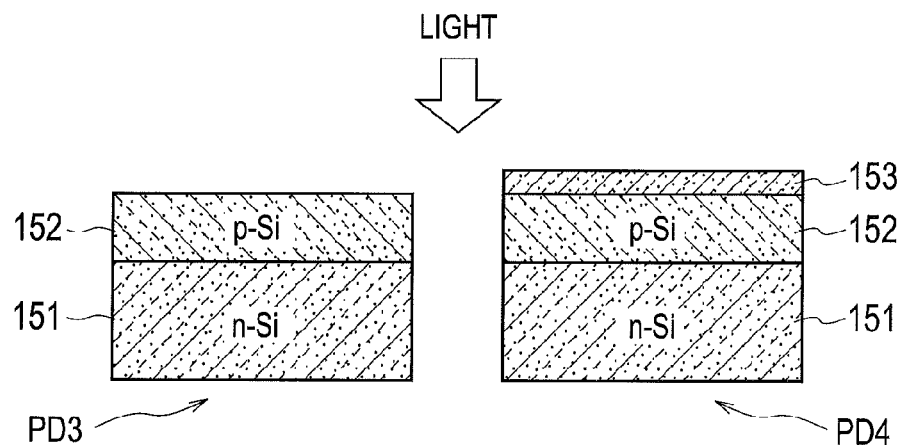
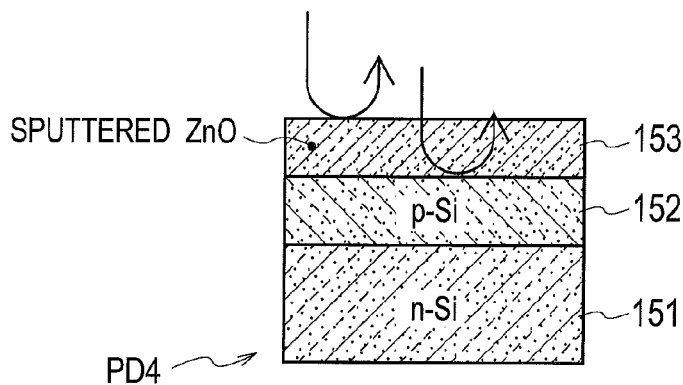

OPTICAL FILTER

CROSS-REFERENCE TO RELATED APPLICATIONS

This application is a divisional of application Ser. No. 13/274,289, filed on Oct. 14, 2011. Furthermore, this application claims the benefit of priority of Japanese applications No. 2010-231447 filed on Oct. 14, 2010, 2011-071987 filed on Mar. 29, 2011, and 2011-222770 filed on Oct. 7, 2011. The disclosures of these prior U.S. and Japanese applications are incorporated herein by reference.

BACKGROUND OF THE INVENTION

1. Field of the Invention

The present invention relates to: a photodetection device which is a device having a photoelectric conversion function and configured to detect light of wavelengths in a specific range; and an optical filter used in the photodetection device.

2. Description of the Related Art

Some photodetection devices use what is called a photoconductive sensor element configured to detect ultraviolet light applied onto a light receiving portion thereof on the basis of change in the amount of photoinduced current in the light receiving portion. Si semiconductor and the like having detection sensitivity to visible light in a wavelength range from 400 nm to 750 nm and the like have conventionally been considered for this photoconductive sensor element, for its inexpensiveness and easiness in controlling doping. The principle of photodetection of the photoconductive sensor element is as follows. As the semiconductor of the light receiving portion is irradiated with light having energy equal to or greater than the bandgap, electron-hole pairs are created in the semiconductor by a photoelectric conversion function, and these carriers are taken out to an external circuit by an externally applied voltage and detected as an amount of photoinduced current.

Conventional photoelectric conversion elements are generally made of Si as mentioned above. However, since Si is sensitive to all the wavelength ranges shorter than 1.1 µm, it is impossible to take out only light of specific wavelengths and measure the amount of that light.

In this respect, a visible light cut filter is generally an interference filter in which films with mutually different normal refractive indexes are alternately stacked. However, the cut bandwidth is determined by the difference between the refractive indexes of the films to be used, and thus, it is difficult to set the entire visible light range from 400 to 800 nm as the wavelength range within which the interference filter can cut the light amount down to approximately 0. In addition, the interference filter inevitably has uncuttable wavelengths, so that the interference filter may be able to cut visible light but fails to cut infrared light. In this case, it is difficult to transmit and measure only ultraviolet light because the Si photoelectric conversion element is sensitive also to infrared light.

Meanwhile, for the purpose of solving the above problem that occurs due to the combination of an interference filter and an Si photoelectric conversion element, a configuration has been proposed in which light is detected while setting mutually different light receiving sensitivity wavelength ranges by making the depths of pn junction interfaces, i.e., the depths of photoelectric conversion regions, different from each other. Specifically, one pn junction interface is formed shallow so that light can be detected by the photoelectric conversion region having excellent sensitivity characteristics to relatively short wavelength ranges. The other pn junction interface is formed deep so that light can be detected by the photoelectric conversion region having a fine sensitivity to long wavelengths. Then, the difference between the two detected signals is calculated. As a result, short wavelength light can be detected (see Japanese Patent Application Publication Nos. 2009-158570, 2007-67331, 2002-164565, 2009-158928, 2007-305868, 2006-318947, for example).

In this case, however, the sensitivity to the ultraviolet range is poor. In addition, the depths of the pn junctions need to be adjusted for each detection target wavelength range in the ultraviolet range, which is extremely troublesome. Moreover, it is difficult to detect only light in the ultraviolet range regardless of how the depths of the pn junctions are adjusted.

Meanwhile, there is a configuration as described in Patent Document 2 in which: the same depth is set for the pn junctions of two photoelectric conversion regions; an ultraviolet light absorption film configured to absorb part of ultraviolet light is formed on one of photodiodes; and the difference between the photodiodes is figured out. However, the ultraviolet light absorption film is considered as a film configured to absorb part of ultraviolet light, and as described in the document, is a film that can only weaken ultraviolet light to be received, by absorbing part of the ultraviolet light. Since the level of the ultraviolet light absorption is weak, the detection sensitivity obtained from the calculation of the difference is weak as well.

Further, the following problem occurs when the difference between a photodiode A with an optical filter formed thereon and a photodiode B provided with no optical filter is figured out as in Patent Document 2. In the photodiode A with the optical filter formed thereon, interference fringes are generated as a result of the interference between reflected light from the surface of the optical filter and reflected light from the interface between the optical filter and the semiconductor layer. Consequently, the photodetection signal comes to contain a signal caused by the interference fringes, making accurate detection impossible.

As described above, it has been difficult to detect measurement-target light in a specific wavelength range selectively with a high sensitivity.

SUMMARY OF THE INVENTION

The present invention has been made for solving the above problems, and an object thereof is to provide: a photodetection device capable of detecting light in a specific wavelength range selectively with a high sensitivity; and an optical filter used in the photodetection device.

To achieve the above object, the photodetection device of the present invention has a main feature which provides a photodetection device including multiple photodetectors configured to detect light through photoelectric conversion and including at least: a first photodetector including a light absorption semiconductor layer at a side closer to a light receiving surface of the first photodetector than is a photoelectric conversion region of the first photodetector, the light absorption semiconductor layer configured to absorb light in a wavelength range λ; and a second photodetector including a transmissive film at a side closer to a light receiving surface of the second photodetector than is a photoelectric conversion region of the second photodetector, the transmissive film having no light absorption range. In the photodetection device, an amount of light in the wavelength range λ is measured through computation using a signal from the first photodetector and a signal from the second photodetector.

Moreover, another configuration of the photodetection device of the present invention has a main feature which provides a photodetection device including multiple photodetectors configured to detect light through photoelectric conversion and including at least: a first photodetector including a first optical filter at a side closer to a light receiving surface of the first photodetector than is a photoelectric conversion region of the first photodetector, the first optical filter configured to absorb light in a wavelength range λ; and a second photodetector including a second optical filter at a side closer to a light receiving surface of the second photodetector than is a photoelectric conversion region of the second photodetector, the second optical filter configured to absorb light in a wavelength range λ1 including the wavelength range λ or having no light absorption range. In the photodetection device, the first and second optical filters are formed such that an interference fringe attributable to thicknesses of the filters is not present in a light transmission spectrum, and an amount of light in the wavelength range λ is measured through computation using a signal from the first photodetector and a signal from the second photodetector.

Furthermore, the optical filter of the present invention has a main feature which provides an optical filter formed by curing a paste substance. In the optical filter, the paste substance contains semiconductor particles for absorbing light in a certain wavelength range.

The photodetection device of the present invention includes at least: the first photodetector including the light absorption semiconductor layer at the side closer to the light receiving surface of the first photodetector than is the photoelectric conversion region of the first photodetector, the light absorption semiconductor layer configured to absorb light in the wavelength range λ; and the second photodetector including the transmissive film at the side closer to the light receiving surface of the second photodetector than is the photoelectric conversion region of the second photodetector, the transmissive film having no light absorption range. Accordingly, light in the wavelength range λ can be detected selectively with a high sensitivity, without having to adjust the depth relationship between the two photoelectric conversion regions as in the conventional cases.

Moreover, the photodetection device of the present invention includes at least: the first photodetector including the first optical filter configured to absorb light in the certain wavelength range λ; and the second photodetector including the second optical filter configured to absorb light in the wavelength range λ1 including the wavelength range λ or having no light absorption range. Moreover, the first and second optical filters are formed such that there is an interference fringe attributable to the thicknesses of the optical filters is not present in a light transmission spectrum; and the amount of the light in the wavelength range λ is measured through computation using the signal from the first photodetector and the signal from the second photodetector. Thus, noises due to interference fringes are completely removed. Accordingly, light in a desired wavelength range can be detected selectively with a high sensitivity.

Moreover, the optical filter of the present invention is the optical filter formed by curing the paste substance, and the paste substance contains the semiconductor particles for absorbing light in the certain wavelength range. Accordingly, the optical filter can be so formed as to absorb light in a specific wavelength range and to eliminate interference fringes attributable to the thicknesses of the optical filters.

BRIEF DESCRIPTION OF THE DRAWINGS

FIG. 3 is a cross-sectional view showing still another example structure of the photodetection device of the present invention.

FIG. 20 is a cross-sectional view showing the configurations of light receiving elements used for the purpose of measuring the characteristics in FIG. 18.

FIGS. 21A and 21B are diagrams showing a state where an interference fringe is generated in a light receiving element including a conventional optical filter.

DESCRIPTION OF THE PREFERRED EMBODIMENTS

Hereinbelow, an embodiment of the present invention will be described with reference to the drawings. A photodetection device of the present invention is formed of photoelectric conversion elements each having a semiconductor photoelectric conversion layer as its base. Here, the semiconductor photoelectric conversion layer refers to a semiconductor layer having a function to convert light into an electric current, and is for example a semiconductor layer having a depletion layer formed in a pn junction or Schottky junction.

Figure 1:
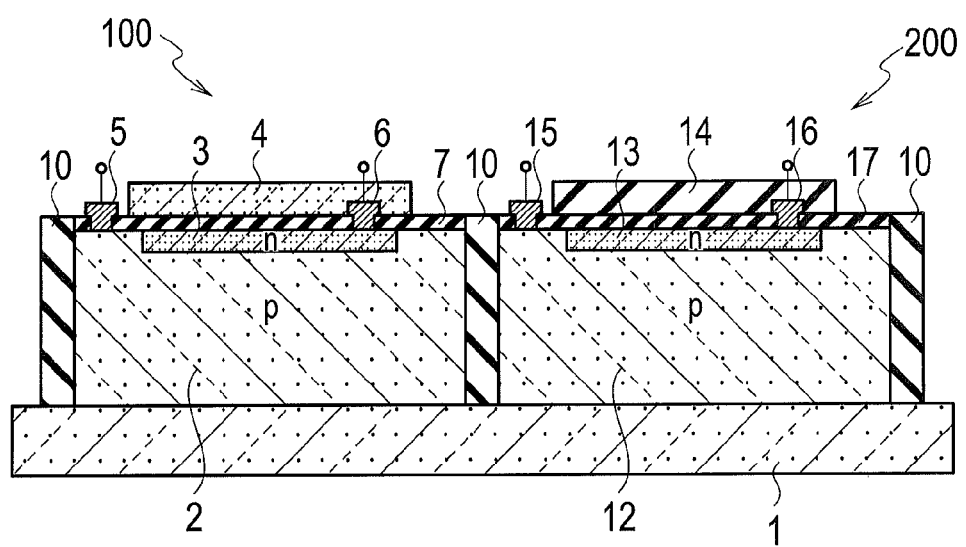
FIG. 1 is a cross-sectional view showing an example structure of a photodetection device of the present invention.

First, the photodetection device can be configured as shown in FIG. 1. FIG. 1 is a cross-sectional view showing the structure of the photodetection device of this embodiment of the present invention. The photodetection device includes a shared support substrate 1. Silicon may be used for the support substrate 1, for example. A light receiving element 100 and a light receiving element 200 each serving as one individual photodetector are formed on the support substrate 1. The light receiving elements 100 and 200 are elements configured to detect light applied from an upper side in the drawing. The polarities p and n may the reverse of FIG. 1, and the same applies to the following.

In the light receiving element 100, a p-type layer 2 is formed with an interlayer insulator 10 as a boundary. The p-type layer 2 has an n-type layer 3 buried in its superficial portion. The n-type layer 3 is formed by doping n-type impurities through the surface of a region of the superficial portion situated inward of the periphery of the p-type layer 2 by some distance in a plan view. Thus, in the light receiving element 100, there is formed a photoelectric conversion region A formed of a pn junction of the p-type layer 2 and the n-type layer 3. In general, light receiving elements are such that, after entering the light receiving surface, light having a shorter wavelength is absorbed at a shallower position.

The surface of each of the p-type layer 2 and the n-type layer 3 is covered with a transparent protection film 7 made of SiO$_2$, SiN, or the like. In addition, the side surface of the p-type layer 2 is covered with the interlayer insulator 10. Like the protection film 7, the interlayer insulator 10 is formed of a transparent film made of SiO$_2$, SiN, or the like. The protection film 7 has an anode electrode 5 and a cathode electrode 6 formed thereon. The anode electrode 5 is connected to the p-type layer 2 through an opening formed in the protection film 7. The cathode electrode 6 is connected to the n-type layer 3 through another opening formed in the protection film 7. Thus, a photoelectric current produced by photoelectric conversion in the pn junction region of the p-type layer 2 and the n-type layer 3 is outputted from the cathode electrode 6 as a photodetection signal.

Meanwhile, the protection film 7 has an ultraviolet light absorption semiconductor layer 4 formed thereon in such a manner as to cover the cathode electrode 6. The ultraviolet light absorption semiconductor layer 4 is a light absorption semiconductor layer configured to absorb light in a wavelength range λ. Specifically, the ultraviolet light absorption semiconductor layer 4 is an ultraviolet light absorption layer playing a role of an optical filter configured to absorb ultraviolet light and transmit light of longer wavelengths than that of the ultraviolet light, and is a thin film made of a semiconductor. The ultraviolet range here refers to a wavelength range of 400 nm down to about 200 nm. This ultraviolet range is further divided into an ultraviolet light A (above a wavelength of 320 nm but at or below 400 nm), an ultraviolet light B (above a wavelength of 280 nm but at or below 320 nm), and an ultraviolet light C (at or below a wavelength of 280 nm).

Moreover, the ultraviolet light absorption semiconductor layer 4 provided on the light receiving surface side is formed in such a size as to cover the entire photoelectric conversion region A formed of the pn junction of the p-type layer 2 and the n-type layer 3. The ultraviolet light absorption semiconductor layer 4 is formed to have an area equal to or larger than the area of the photoelectric conversion region A.

For the ultraviolet light absorption semiconductor layer 4, it is desirable to use a material that selectively absorbs only ultraviolet light. ZnO, MgZnO, TiO$_2$, SrTiO$_2$, InGaZnO, and the like are available as oxide materials satisfying the above the requirement. InGaN, AlGaN, GaN, and the like may be used instead. These are materials having a bandgap allowing no adsorption of light in a visible light range, and are high in resistance. In this embodiment, Mg$_X$Zn$_{1-X}$O (0≤X<1) is used.

On the other hand, in the light receiving element 200, a p-type layer 12 on the support substrate 1 has an n-type layer 13 buried in its superficial portion. The n-type layer 13 is formed by doping n-type impurities through the surface of a region of the superficial portion situated inward of the periphery of the p-type layer 12 by some distance in a plan view. Thus, in the light receiving element 200, there is formed a photoelectric conversion region B formed of a pn junction of the p-type layer 12 and the n-type layer 13.

The pn junctions in the photoelectric conversion regions A and B are created at the same depth but may be formed at mutually different depths instead. Moreover, it is desirable that each pn junction interface should not be formed at a very deep position, in order to reduce contributions to infrared light as much as possible.

The surface of each of the p-type layer 12 and the n-type layer 13 is covered with a transparent protection film 17 made of SiO2, SiN, or the like. In addition, the side surface of the p-type layer 12 is covered with the interlayer insulator 10. The protection film 17 has an anode electrode 15 and a cathode electrode 16 formed thereon. The anode electrode 15 is connected to the p-type layer 12 through an opening formed in the protection film 17. The cathode electrode 16 is connected to the n-type layer 13 through another opening formed in the protection film 17. Thus, a photoelectric current produced by photoelectric conversion in the pn junction region of the p-type layer 12 and the n-type layer 13 is outputted from the cathode electrode 16 as a photodetection signal.

Meanwhile, the protection film 17 has a transmissive film 14 formed thereon in such a manner as to cover the cathode electrode 16. The transmissive film 14 is used as an optical filter having no light absorption range. For the transmissive film 14, a dielectric material is used which absorbs no ultraviolet light, is transparent to the ultraviolet light and light of longer wavelengths than that of the ultraviolet light, and is insulative. $SiO_2$, $ZrO_2$, $Al_2O_3$, $Si_3N_4$, and the like are available for the dielectric material used for the transmissive film 14. These dielectric materials have a very high transmittance to not only the ultraviolet light but also visible light to infrared light. In addition, like the transmissive film 14, a film that is transparent to the ultraviolet light and light of longer wavelengths than that of the ultraviolet light is desirable for the protection films 7 and 17. Thus, like the transmissive film 14, the protection films 7 and 17 are desirably made of any of the dielectric materials mentioned above.

Moreover, the transmissive film 14 provided on the light receiving surface side is formed in such a size as to cover the entire photoelectric conversion region B formed of the pn junction of the p-type layer 12 and the n-type layer 13. The transmissive film 14 is formed to have an area equal to or larger than the area of the photoelectric conversion region B.

A method of fabricating the ultraviolet light detection device of FIG. 1 will be described. An example fabrication procedure will be described only briefly since the device can be created by using a widely known fabrication technique. An n-type silicon layer is formed on the support substrate 1. The surface (top surface) of the n-type silicon layer is oxidized to form an oxide coating $SiO_2$, which will become the protection films 7 and 17. Holes are bored through the oxide coating $SiO_2$, and p-type impurities are introduced therethrough by ion implantation or the like to create the p-type layers 2 and 12. Next, additional holes are bored through the oxide coating $SiO_2$, and n-type impurities are introduced therethrough into a region of each of the p-type layers 2 and 12 by ion implantation or the like to create the n-type layers 3 and 13. Meanwhile, the regions of the holes formed in the oxide coating $SiO_2$ will be the regions of the p- and n-type layers which the anode and cathode electrodes 5, 6, 15, and 16 will contact, respectively. Thus, contact regions are formed by ion implantation or the like so that the contact resistance can be reduced. Thereafter, middle portions and outer portions of the silicon layer are oxidized to create another oxide coating $SiO_2$ as the interlayer insulators 10. Next, the anode electrodes and the cathode electrodes are formed by sputtering or vapor deposition, and thereafter the ultraviolet light absorption semiconductor layer 4 and the transmissive 14 are formed. Lastly, wiring and the like are performed.

Figure 4A:
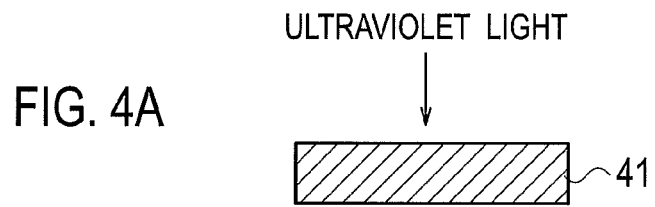
FIGS. 4A to 4E are diagrams showing steps in an experiment for describing that when ZnO is used for an ultraviolet light absorption semiconductor layer, the reflection of ultraviolet light at the surface of the ZnO can be ignored.

Next, FIGS. 4A to 4E and FIG. 5 show that use of $Mg_xZn_{1-x}O$ ($0 \leq X < 1$) for the ultraviolet light absorption semiconductor layer 4 allows the detection of only ultraviolet light. FIGS. 4A to 4E show how steps in an experiment are performed. A commercially-available silicon photodiode is used, and photoelectric current outputs obtained by applying ultraviolet light and visible light are compared. First, as shown in FIG. 4A, only ultraviolet light of a wavelength of 365 nm is applied onto a silicon photodiode 41 to measure a photoelectric current $I_U$.

Figure 4B:
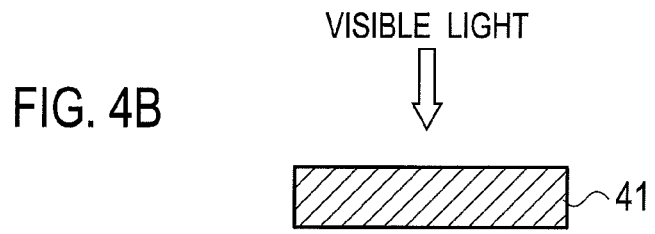
Figure 4C:
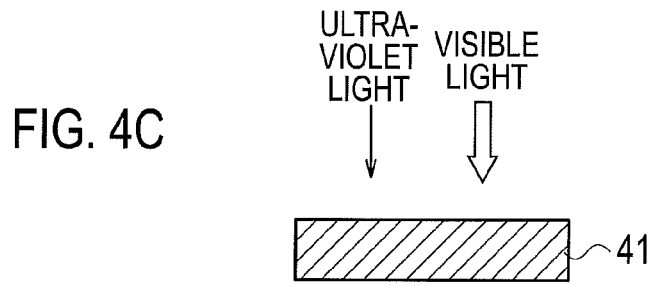
Figure 4D:
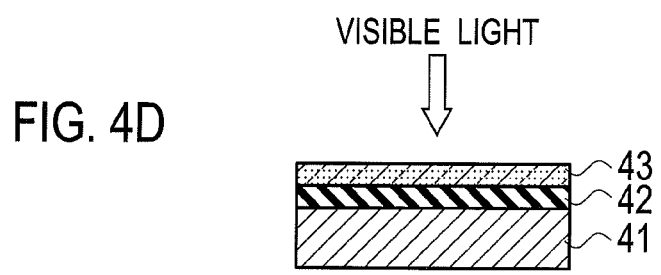
Figure 4E:
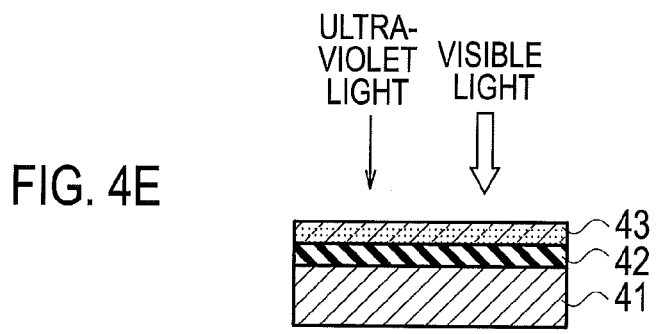

Next, as shown in FIG. 4B, only visible light is applied onto the silicon photodiode 41 to measure a photoelectric current $I_V$. Next, as shown in FIG. 4C, the 365-nm-wavelength ultraviolet light and the visible light are applied onto the silicon photodiode 41 to measure a photoelectric current $I_{U+V}$. As shown in FIG. 4D, a stacked body in which a ZnO layer 43 is formed on a glass substrate 42 is disposed on the silicon photodiode 41. In this state, only the visible light is applied from above to measure a photoelectric current $I1_V$. Next, as shown in FIG. 4E, the same configuration as FIG. 4D is used, but both of the 365-nm-wavelength ultraviolet light and the visible light are applied to measure a photoelectric current $I1_{U+V}$.

Here, a reflected component of the visible light at the surface of the ZnO layer 43 is calculated. The amount of the reflected component can be expressed as ($I_V - I1_V$). Meanwhile, it is judged whether or not the ultraviolet light is reflected at the surface of the ZnO layer 43. To do so, $I_V$ obtained from the measurement of FIG. 4B is subtracted from $I1_{U+V}$ obtained from the measurement of FIG. 4E, and the amount of the reflected component of the visible light ($I_V - I1_V$) at the surface of the ZnO layer 43 in FIG. 4D is added thereto. In this way, calculated is the detection value of only the ultraviolet light in the measurement of FIG. 4E. In short, the calculation is expressed as $\{I1_{U+V} - I_V + (I_V - I1_V)\}$. $I_U = \{I1_{U+V} - I_V + (I_V - I1_V)\}$ should be obtained if the ultraviolet light in the measurement of FIG. 4E is absorbed with substantially no reflected component at the surface of the ZnO layer 43.

Figure 5:
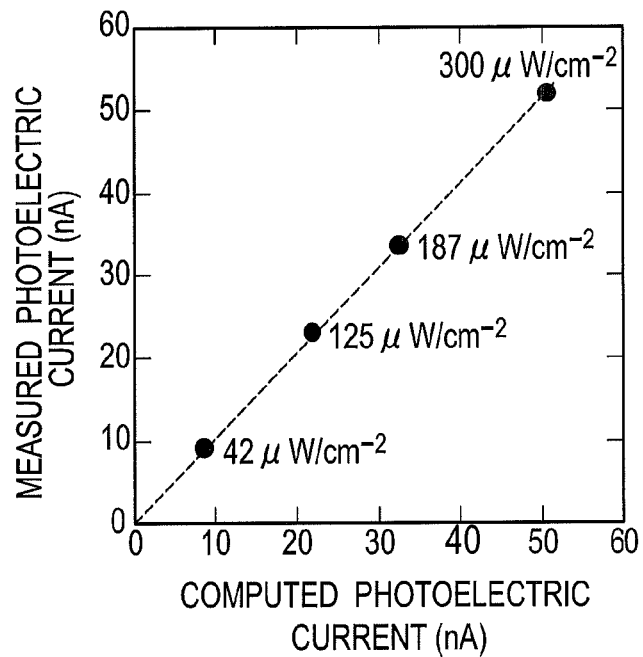
FIG. 5 is a graph showing a measurement result obtained from the steps in the experiment.

FIG. 5 is a graph showing a set of data plotted along a vertical axis representing the photoelectric current $I_U$ in the measurement of FIG. 4A and a horizontal axis representing $\{I1_{U+V} - I_V + (I_V - I1_V)\}$. The unit is nanoampere (nA) in both the vertical and horizontal axes. In addition, measurement and calculation, which are the same as those described above, are performed while varying the power of the 365-nm wavelength ultraviolet light from 42 $\mu W/cm^2$ to 125 $\mu W/cm^2$, 187 $\mu W/cm^2$, and 300 $\mu W/cm^2$, and then the obtained set of data is plotted. As can be seen from FIG. 5, a directly proportional straight line is obtained, showing that $I_U = \{I1_{U+V} - I_V + (I_V - I1_V)\}$.

Figure 6A:
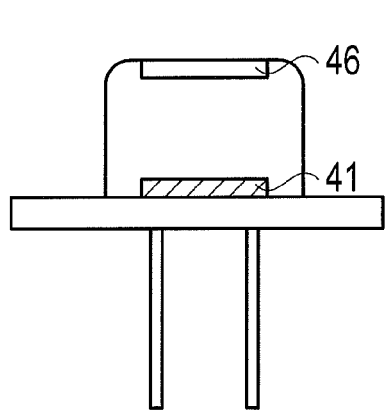
FIGS. 6A and 6B are diagrams showing experiment configurations for describing that when ZnO is used for the ultraviolet light absorption semiconductor layer, ultraviolet light passing through the ZnO can be ignored.

Next, let us show that an $Mg_xZn_{1-x}O$ layer serving as the ultraviolet light absorption semiconductor layer 4 absorbs ultraviolet light substantially completely, and the transmitted components can be ignored. Reference sign 41 shown in FIGS. 6A and 6B denotes a commercially-available silicon PIN photodiode. First, the silicon PIN photodiode is packaged as shown in FIG. 6A; both of ultraviolet light and visible light are applied through a light receiving window 46; and the resultant photoelectric current is measured. In the measurement, the photoelectric current is measured first with the output (power density) of the ultraviolet light set at 0 and then the power density is increased gradually to thereby measure the correlation between the photoelectric current and the power density of the ultraviolet light. A curve C1 in FIG. 7A represents the measurement result.

Figure 6B:
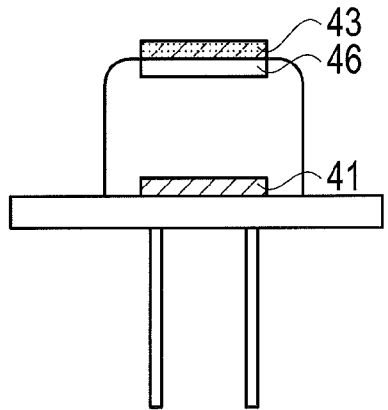

On the other hand, as shown in FIG. 6B, a ZnO layer 43 with a film thickness of 500 nm is disposed on the top surface of the light receiving window 46 of the same package used in the measurement of C1, and both of ultraviolet light and visible light are applied in the same manner as the measurement of C1. As in the case of C1, the photoelectric current is measured first with the output of the ultraviolet light set at 0 and then the power density is increased gradually. C2 in FIG. 7A represents the measurement result.

Figure 7A:
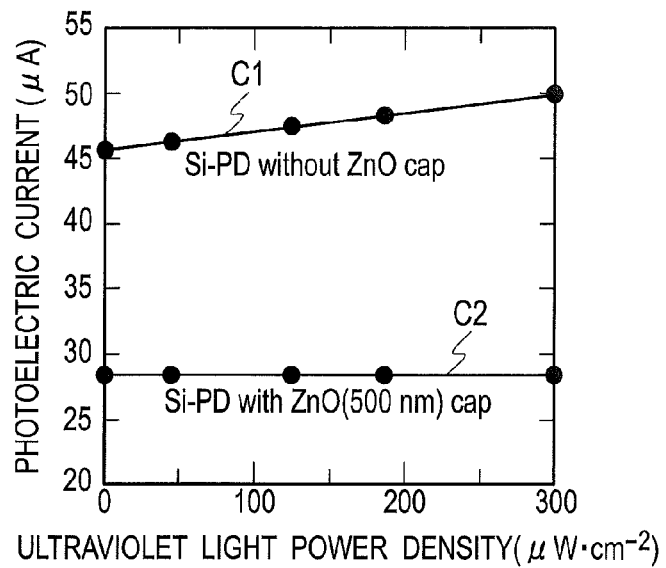
FIGS. 7A and 7B are graphs showing measurement results obtained from the configurations in FIGS. 6A and 6B.
Figure 7B:
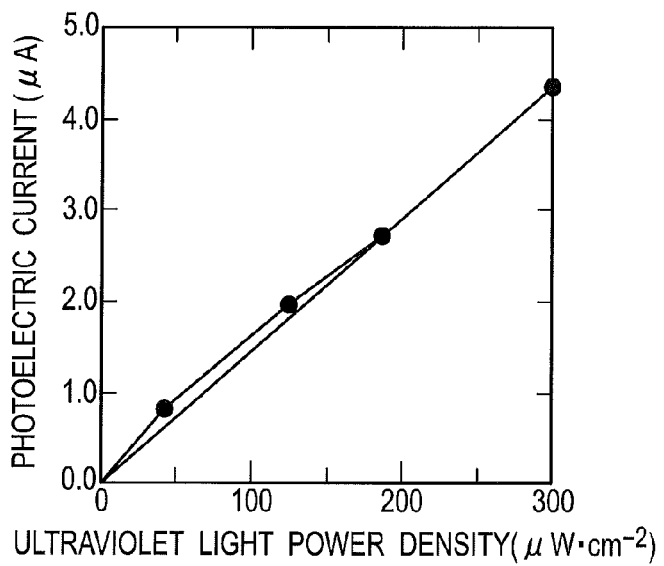

As C1 in FIG. 7A shows, without the cap of the ZnO layer, the photoelectric current increases proportionally to the increase in the intensity of the ultraviolet light with the detected electric current of the visible light as a base. In contrast, as C2 shows, with the cap of the ZnO layer, the photoelectric current substantially keeps a state of 0 ultraviolet light output, i.e., the value of the photoelectric current obtained when only the visible light is detected, regardless of any increase in the intensity of the ultraviolet light. FIG. 7B is a graph illustrating a result of subtracting C2 from C1 with the difference between their photoelectric currents, which is attributable to the difference in the visible light output, being adjusted. In FIG. 7B, a substantially directly proportional straight line is found. FIGS. 7A and 7B show that the ZnO layer 43 absorbs the ultraviolet light substantially completely.

Figure 10:
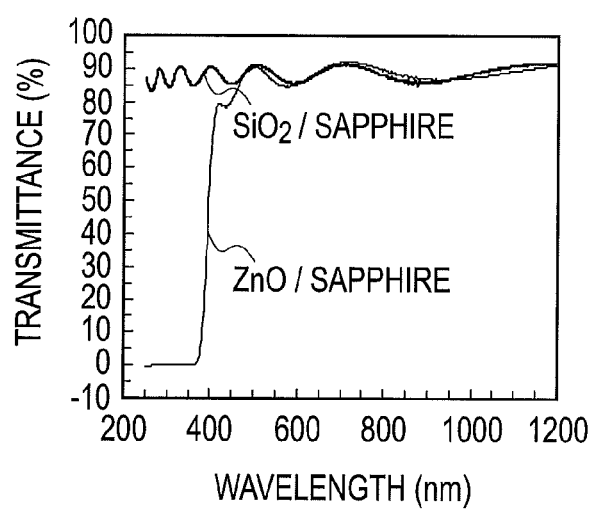
FIG. 10 is a graph showing the light transmission spectrum of each of ZnO/sapphire and $SiO_2$/sapphire.

Next, FIG. 10 shows that ZnO selectively absorbs only light in the ultraviolet range substantially completely. FIG. 10 shows transmittance spectra each covering the wavelengths of light ranging from ultraviolet light to visible light to infrared light in a case where a stacked body A and a stacked body B are irradiated with the range of light. The stacked body A has a ZnO layer formed on a sapphire substrate while the stacked body B has an $SiO_2$ film formed on the sapphire substrate. Sapphire substrate and $SiO_2$ are known to be transparent to a wide range of light from ultraviolet light to infrared light. Here, the transmittance spectrum of the $SiO_2$/sapphire is as shown by a curve in FIG. 10. On the other hand, in the curve of the ZnO/sapphire, the transmittance decreases abruptly around about a wavelength of 400 nm to a transmittance of 0 and maintains this transmittance of 0 for the ultraviolet light.

Figure 8A:
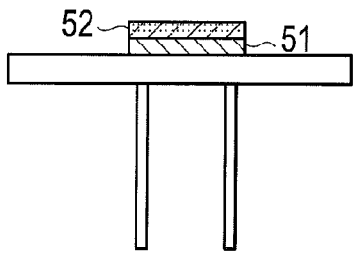
FIGS. 8A and 8B are diagrams showing structures in which ZnO and $SiO_2$ are formed on PIN PDs, respectively.
Figure 8B:
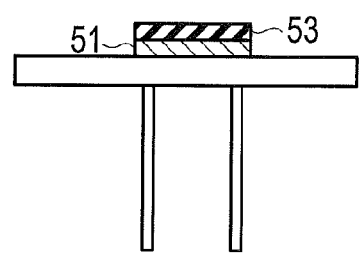

Measurement is performed using ZnO having the above characteristics. First, as shown in FIG. 8A, a ZnO layer 52 is formed on a silicon PIN photodiode (Si PIN-PD) 51. Assume this as a light receiving element 1. Next, as shown in FIG. 8B, an $SiO_2$ film 53 is formed on a different silicon PIN photodiode 51. Assume this as a light receiving element 2. Then, these light receiving elements are irradiated with light in a wavelength range from 200 nm to 1200 nm, and their spectral sensitivities are measured.

Figure 9:
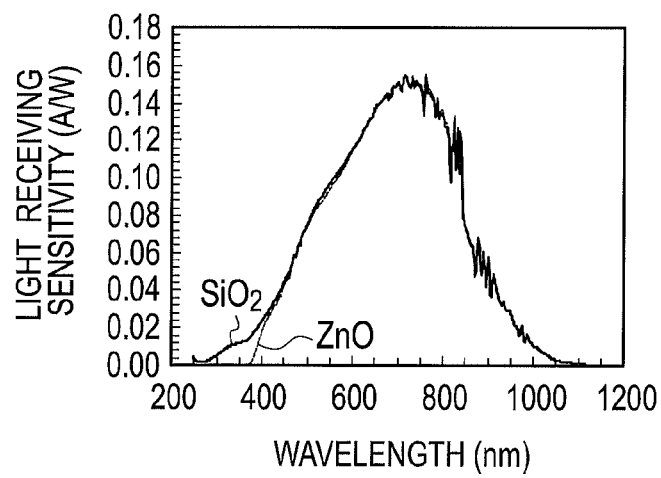
FIG. 9 is a graph showing curves of light receiving sensitivity measured from the structures in FIGS. 8A and 8B.

FIG. 9 shows curves of the light receiving sensitivities of the light receiving elements 1 and 2. The horizontal axis in FIG. 9 represents the wavelength (nm) while the vertical axis in FIG. 9 represents the light receiving sensitivity (A/W). The light receiving sensitivity is expressed as the ratio between the amount of light (watt) incident on the element and the photoelectric current (ampere) flowing in the element. A curve denoted by $SiO_2$ in FIG. 9 corresponds to the light receiving element 2 (light receiving element in FIG. 8B) while a curve denoted by ZnO in FIG. 9 corresponds to the light receiving element 1 (light receiving element in FIG. 8A). As can be seen from the spectral sensitivity curves, in the light receiving element 1, the ZnO layer 52 absorbs ultraviolet light substantially completely, and therefore the sensitivity in the ultraviolet range is 0. On the other hand, in the light receiving element 2, the silicon PIN photodiode 51 receives the ultraviolet light, and therefore the light in the ultraviolet range is also detected as photoelectric current outputs.

Figure 11:
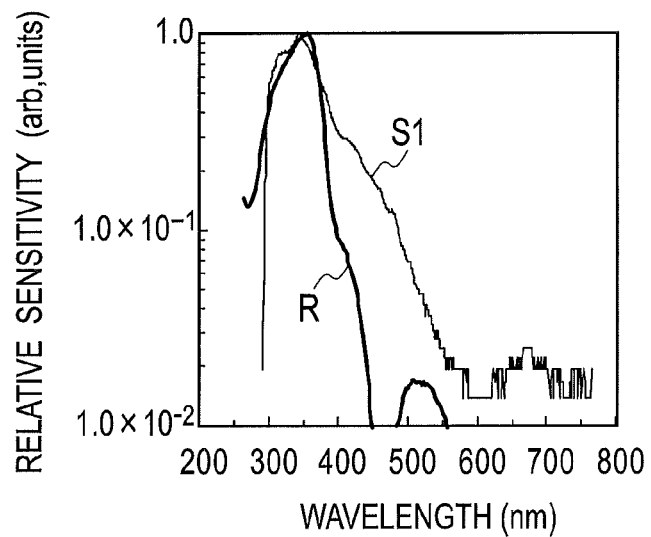
FIG. 11 is a graph showing a sensitivity curve calculated by finding the difference between the sensitivity curves in FIG. 9.

R in FIG. 11 shows a curve obtained by subtracting the sensitivity curve of the light receiving element 1 in FIG. 9 from the sensitivity curve of the light receiving element 2 in FIG. 9. S1 is a spectral sensitivity curve found as follows. Specifically, the depths of the pn junctions of the silicon photodiodes described in the conventional techniques are made different from each other, and a photoelectric current detected in one pn junction is subtracted from a photoelectric current detected in the other pn junction. As can be seen by comparing R and S1, the measurement result of R shows that only the ultraviolet range can be detected selectively with a very high sensitivity.

Meanwhile, FIG. 1 shows how the above-described light receiving elements 1 and 2 are actually aligned and configured. In FIG. 1, the light receiving elements 100 and 200 correspond to the light receiving elements 1 and 2, respectively. Moreover, the ultraviolet light absorption semiconductor layer 4 corresponds to the ZnO layer 52 in FIG. 8A, and the elements below the ultraviolet light absorption semiconductor layer 4 correspond to the silicon PIN photodiode 51. Furthermore, the transmissive film 14 corresponds to the $SiO_2$ film 53 in FIG. 8B, and the elements below the transmissive film 14 correspond to the silicon PIN photodiode 51.

By subtracting the detection signal of the light receiving element 1 from the detection signal of the light receiving element 2 as described above, it is possible to extract the detection output of an ultraviolet light component with a very high sensitivity.

Figure 12:
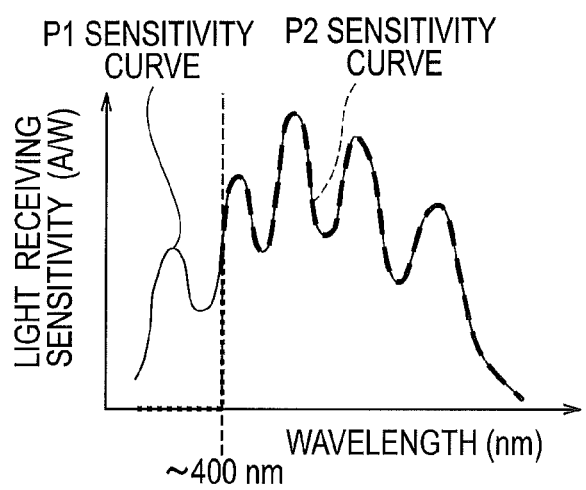
FIG. 12 is a graph showing a state where interference fringes present in the light receiving sensitivities of the light receiving elements are caused to coincide with each other by using the ultraviolet light absorption semiconductor layer and transmissive film in the configuration in FIG. 1
Figure 13:
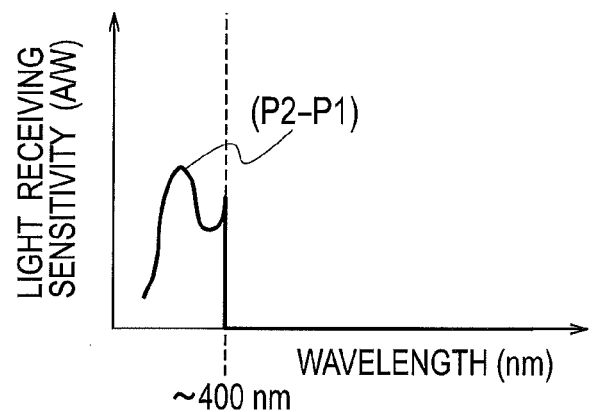
FIG. 13 is a graph showing a sensitivity curve calculated by finding the difference between the sensitivity curves in FIG. 12.

Meanwhile, light incident on the ultraviolet light absorption semiconductor layer 4 generates a reflected wave at the interface between the ultraviolet light absorption semiconductor layer 4 and the protection film 7. This reflected wave interferes with a progressive wave, consequently causing an interference fringe in the light receiving element 100. Moreover, light incident on the transmissive film 14 generates a reflected wave at the interface between the transmissive film 14 and the protection film 7. This reflected wave interferes with a progressive wave, consequently causing an interference fringe in the light receiving element 200. These fringes affect the spectral sensitivity characteristics. FIG. 12 shows spectral sensitivity curves generated corresponding to the interference fringes. As shown in FIG. 12, the sensitivity curves wave in a shape corresponding to the interference fringes.

Here, since the ultraviolet light absorption semiconductor layer 4 of the light receiving element 100 and the transmissive film 14 of the light receiving element 200 are made of different materials, their refractive indexes are different. Thus, the pitch, size, and the like of the interference fringe differ between the light receiving elements 100 and 200. Note that differences in the pitch and size of the interference fringe affect the sensitivity curve, making accurate measurement impossible. In this respect, FIG. 12 shows that peaks and valleys in fluctuations in both sensitivity curves are caused to coincide with each other by setting the same optical film thickness to both of the ultraviolet light absorption semiconductor layer 4 of the light receiving element 100 and the transmissive film 14 of the light receiving element 200.

Here, the optical film thickness is expressed as film thickness×refractive index. Accordingly, when N1 and T1 are the refractive index and film thickness of the ultraviolet light absorption semiconductor layer 4, respectively, and n and t are the refractive index and film thickness of the transmissive film 14, respectively, the film thickness T1 of the ultraviolet light absorption semiconductor layer 4 and the film thickness t of the transmissive film 14 should be adjusted to satisfy N1×T1=n×t.

As shown in FIG. 12, the spectral sensitivity curves coincide with each other in a wavelength range above 400 nm when the interference fringes of the light receiving elements 100 and 200 coincide with each other. Hence, by subtracting the sensitivity curve P1 of the light receiving element 100 from the sensitivity curve P2 of the light receiving element 200, a photoelectric current can be detected with a very high sensitivity from ultraviolet light of a wavelength of 400 nm or below. Note that an extremely thin semiconductor layer made of the same material as the ultraviolet light absorption semiconductor layer 4 may be formed on the transmissive film 14 of the light receiving element 200 to provide the same surface reflection characteristic as those of the light receiving element 100.

Figure 2:
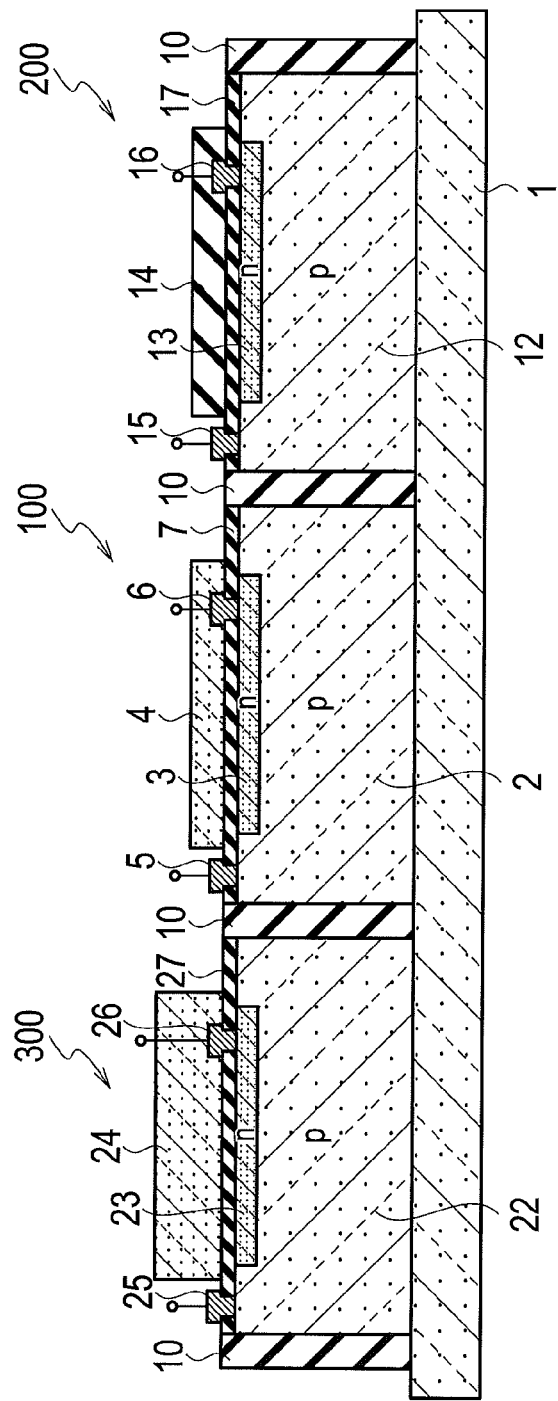
FIG. 2 is a cross-sectional view showing another example structure of the photodetection device of the present invention.

In FIG. 2, a light receiving element 300 is formed additionally in the configuration of FIG. 1. This light receiving element 300 is formed to have the same structure as the light receiving element 100 but has a different film thickness for the ultraviolet light absorption semiconductor layer. To briefly describe the light receiving element 300 serving as a photodetector, a p-type layer 22 is formed on the support substrate 1 with the interlayer insulator 10 as a boundary. The p-type layer 22 has an n-type layer 23 buried in its superficial portion. The n-type layer 23 is formed by doping n-type impurities through the surface of a region of the superficial portion situated inward of the periphery of the p-type layer 22 by some distance. Thus, in the light receiving element 300, there is formed a photoelectric conversion region C formed of a pn junction of the p-type layer 22 and the n-type layer 23. Light is converted into an electric current in this photoelectric conversion region C and outputted.

The surface of each of the p-type layer 22 and the n-type layer 23 is covered with a transparent protection film 27 made of $SiO_2$, SiN, or the like. In addition, the side surface of the p-type layer 22 is covered with the interlayer insulator 10. The protection film 27 has an anode electrode 25 and a cathode electrode 26 formed thereon. The anode electrode 25 is connected to the p-type layer 22 through an opening formed in the protection film 27. The cathode electrode 26 is connected to the n-type layer 23 through another opening formed in the protection film 27. Thus, a photoelectric current produced by photoelectric conversion in the pn junction region of the p-type layer 22 and the n-type layer 23 is outputted from the cathode electrode 26 as a photodetection signal. In addition, the protection film 27 has an ultraviolet light absorption semiconductor layer 24 formed thereon in such a manner as to cover the cathode electrode 26.

The ultraviolet light absorption semiconductor layer 24 is formed in such a size as to cover the entire photoelectric conversion region C formed of the pn junction of the p-type layer 22 and the n-type layer 23. The ultraviolet light absorption semiconductor layer 24 is formed to have an area equal to or larger than the area of the photoelectric conversion region C. Here, the ultraviolet light absorption semiconductor layer 24 is formed to have a film thickness different from that of the ultraviolet light absorption semiconductor layer 4.

Meanwhile, the component of the ultraviolet light absorption semiconductor layer 4 of the light receiving element 100 may be different from that of the ultraviolet light absorption semiconductor layer 24 of the light receiving element 300 in some cases. Since a different component of the ultraviolet light absorption semiconductor layer leads to a different refractive index, the interference fringe are different between the light receiving elements 100 and 300 as mentioned above. If the interference fringe of the light receiving element 300 is to coincide with those of the light receiving elements 100 and 200, the thicknesses of the ultraviolet light absorption semiconductor layer 4 and 24 become different from each other. Then, the optical film thickness may be determined based on the transmissive film 14. In this case, when N2 and T2 are the refractive index and film thickness of the ultraviolet light absorption semiconductor layer 24, respectively, and n and t are the refractive index and film thickness of the transmissive film 14, respectively, the film thickness T2 of the ultraviolet light absorption semiconductor layer 24 should be adjusted to satisfy $N2 \times T2 = n \times t$.

As described above, there will be multiple light receiving elements with ultraviolet light absorption semiconductor layers differing from each other in film thickness if the ultraviolet light absorption semiconductor layers differ from each other in refractive index.

Next, the ultraviolet light detection device may be configured as shown in FIG. 3. In FIG. 3, a light receiving element 400 is formed additionally in the configuration of FIG. 1. This light receiving element 400 is formed to have the same structure as the light receiving element 100 but has a light receiving area different from the light receiving element 100. To briefly describe the light receiving element 400 serving as a photodetector, a p-type layer 32 is formed on the support substrate 1 with the interlayer insulator 10 as a boundary. The p-type layer 32 has an n-type layer 33 buried in its superficial portion. The n-type layer 33 is formed by doping n-type impurities through the surface of a region of the superficial portion situated inward of the periphery of the p-type layer 32 by some distance. Thus, in the light receiving element 400, there is formed a photoelectric conversion region D formed of a pn junction of the p-type layer 32 and the n-type layer 33. Light is converted into an electric current in this photoelectric conversion region D and outputted.

The surface of each of the p-type layer 32 and the n-type layer 33 is covered with a transparent protection film 37 made of $SiO_2$, SiN, or the like. In addition, the side surface of the p-type layer 32 is covered with the interlayer insulator 10. The protection film 37 has an anode electrode 35 and a cathode electrode 36 formed thereon. The anode electrode 35 is connected to the p-type layer 32 through an opening formed in the protection film 37. The cathode electrode 36 is connected to the n-type layer 33 through another opening formed in the protection film 37. Thus, a photoelectric current produced by photoelectric conversion in the pn junction region of the p-type layer 32 and the n-type layer 33 is outputted from the cathode electrode 36 as a photodetection signal. In addition, the protection film 37 has an ultraviolet light absorption semiconductor layer 34 formed thereon in such a manner as to cover the cathode electrode 36.

The ultraviolet light absorption semiconductor layer 34 is formed in such a size as to cover the entire photoelectric conversion region D formed of the pn junction of the p-type layer 32 and the n-type layer 33. The ultraviolet light absorption semiconductor layer 34 is formed to have an area equal to or larger than the area of the photoelectric conversion region D. Here, the photoelectric conversion region D in the light receiving element 400 is formed to have a size (area) different from the size (area) of the photoelectric conversion region A in the light receiving element 100.

Let us assume that S1 is the area (light receiving area) of the photoelectric conversion region A in the light receiving element 100 and that S4 is the area (light receiving area) of the photoelectric conversion region D in the light receiving element 400. The light receiving area is the area of the pn junction interface in this embodiment. Based on a differential signal of the light receiving elements 100 and 400, a detection signal is measured for components of longer wavelengths than ultraviolet light. In the light receiving elements 100 and 400, their respective ultraviolet light absorption semiconductor layers 4 and 34 cut the ultraviolet light. Thus, the difference in detection photoelectric current between the light receiving elements 100 and 400 (I1−I4) is based on incident light of longer wavelengths than the ultraviolet light, i.e. visible light and infrared light. When J0 is a photoelectric current induced per unit area upon incidence of light of longer wavelengths than the ultraviolet light on the light receiving area S1, J0 is likewise obtained for the light receiving area S4 of the light receiving element 400 and can be expressed as below.

$$(I1-I4)=(S1-S4) \times J0$$

(I1−I4) can be figured out through measurement and calculation. Moreover, the value of (S1−S4) can be figured since it is determined based on the design. Thus, J0 can be found easily. Once J0 is calculated, (J0×S2) is subtracted from (J2×

S2) which is the amount of photoelectric current of the light receiving element 200 provided with no ultraviolet light absorption semiconductor layer. Here, S2 is the light receiving area of the light receiving element 200, and J2 is a photoelectric current produced in the light receiving area S2 per unit area. Since J2 is a photoelectric current reflecting the result of the detection of light including the ultraviolet light, visible light, and infrared light, the above subtraction provides a difference that represents the amount of ultraviolet light; that is, the amount of ultraviolet light={(J2×S2)−(J0×S2)}. S2 may be equal to S1. However, in order to prevent cancellation of significant digits of a numerical value in the subtraction computation as much as possible, the following measure may be taken. Multiple combinations of the light receiving elements 100, 200, and 400 are prepared which differ from one another in the light receiving areas of the light receiving elements including ultraviolet light absorption semiconductor layers. An average value of the whole and deviations are calculated for each combination, and the amount of ultraviolet light is finally calculated.

In addition, a visible light cut filter made of a material transparent to ultraviolet light may be formed on the light receiving surface of each of the light receiving elements 100, 200, 300, and 400 in FIGS. 1 to 3. For example, the visible light cut filter is formed on the ultraviolet light absorption semiconductor layers 4, 24, and 34 and the transmissive film 14. This is done for the purpose of minimizing visible light and infrared light having high signal intensities and increasing the accuracy of the subtraction computation. As the visible light cut filter, it is possible to use an interference filter in which dielectric films having different refractive indexes or the like are alternative stacked, for example.

Figure 14:
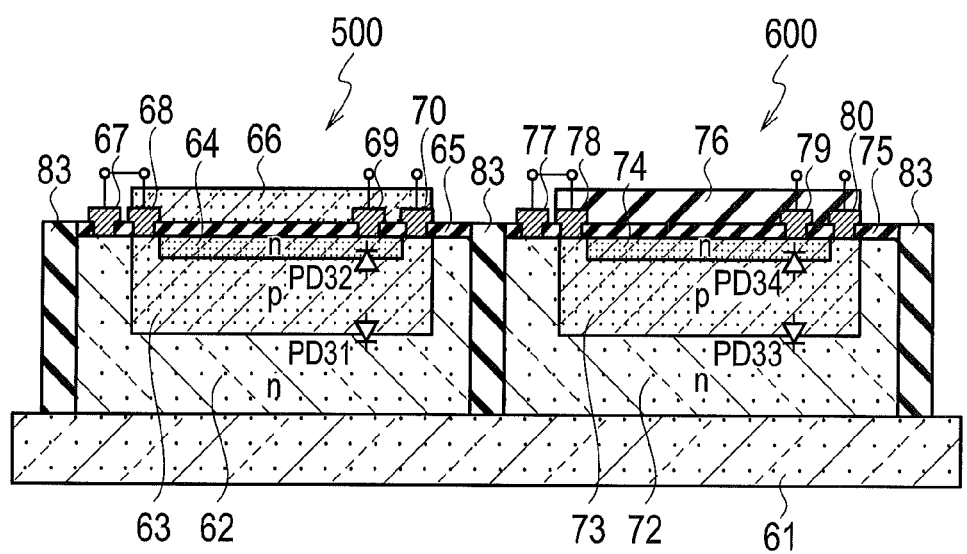
FIG. 14 is a cross-sectional view showing an example structure which is the structure in FIG. 1 but in which two photoelectric conversion regions are provided to each light receiving element.

FIG. 14 shows a photodetection device having a configuration different from those of FIGS. 1 to 3. This photodetection device is formed of a light receiving element 500 and a light receiving element 600 each serving as photodetector. The photodetection device includes a shared support substrate 61. This support substrate 61 serves also as a substrate for epitaxial growth, and a high-resistance material is desirable therefor. Glass may be used, for example.

In the light receiving element 500, an n-type layer 62 has a p-type layer 63 buried in its superficial portion. The p-type layer 63 is buried by doping p-type impurities through the surface of a region of the superficial portion situated inward of the periphery of the n-type layer 62 by a predetermined distance. Thus, in the light receiving element 500, there is formed a first photodiode PD31 (first photoelectric conversion region) formed of a pn junction of the n-type layer 62 and the p-type layer 63.

The p-type layer 63 has an n-type layer 64 buried in its superficial portion. The n-type layer 64 is buried by doping n-type impurities through the surface of a region of the superficial portion situated inward of the periphery of the p-type layer 63 by some distance. Thus, in the light receiving element 500, there is formed a second photodiode PD32 (second photoelectric conversion region) formed of a pn junction of the p-type layer 63 and the n-type layer 64 at a position closer to the light receiving surface than is the first photodiode PD31. In general, light receiving elements having a photodiode structure are such that, after entering the light receiving surface, light having a shorter wavelength is absorbed at a shallower position. Hence, the second photodiode PD32 photoelectrically converts short wavelength light more efficiently than the first photodiode PD31 does.

The surface of each of the n-type layer 62, the p-type layer 63, and the n-type layer 64 is covered with a transparent protection film 65 made of $SiO_2$ or SiN. This protection film 65 has a first anode electrode 68, a first cathode electrode 67, a second anode electrode 70, and a second cathode electrode 69 formed thereon. The first cathode electrode 67 is connected to the n-type layer 62 through an opening formed in the protection film 65. The first anode electrode 68 is connected to the p-type layer 63 through another opening formed in the protection film 65. Here, the first anode electrode 68 and the first cathode electrode 67 are connected to each other by a wiring formed above the protection film 65. Moreover, the first anode electrode 68 is connected to a ground line (unillustrated), for example.

The second anode electrode 70 is connected to the p-type layer 63 through yet another opening formed in the protection film 65. The second cathode electrode 69 is connected to the n-type layer 64 through still another opening formed in the protection film 65. Moreover, the second anode electrode 70 is as well connected to a ground line (unillustrated), for example. Thus, a photoelectric current produced by photoelectric conversion in the second photodiode PD32 is outputted from the second cathode electrode 69 as a photodetection signal.

The protection film 65 has an ultraviolet light absorption semiconductor layer 66 formed thereon in such a manner as to cover a region extending from the first anode electrode 68 to the second anode electrode 70. The ultraviolet light absorption semiconductor layer 66 has the same function as the ultraviolet light absorption semiconductor layers shown in FIGS. 1 to 3, and is made of the same material. Moreover, the ultraviolet light absorption semiconductor layer 66 is formed in such a size as to cover the entire pn junction region of PD31 (first photoelectric conversion region). The ultraviolet light absorption semiconductor layer 66 is formed to have an area equal to or larger than the area of the pn junction region of PD31.

In the light receiving element 500, the pn junction interface of the first photodiode PD31 and the pn junction interface of the second photodiode PD32 are formed at mutually difference depths.

In the light receiving element 500, the first photodiode PD31 is shorted as the first anode electrode 68 and the first cathode electrode 67 are connected to each other. Accordingly, of photoelectric currents originating from light incident on the light receiving surface, the photoelectric current produced by photoelectric conversion in the first photodiode PD31 is released to the ground line, and only the photoelectric current produced by photoelectric conversion in the second photodiode PD32 is outputted from the second cathode electrode 69 as a photodetection signal.

On the other hand, in the light receiving element 600, an n-type layer 72 has a p-type layer 73 buried in its superficial portion. The p-type layer 73 is buried by doping p-type impurities through the surface of a region of the superficial portion situated inward of the periphery of the n-type layer 72 by a predetermined distance. Thus, in the light receiving element 600, there is formed a third photodiode PD33 (third photoelectric conversion region) formed of a pn junction of the n-type layer 72 and the p-type layer 73.

The p-type layer 73 has an n-type layer 74 buried in its superficial portion. The n-type layer 74 is buried by doping n-type impurities through the surface of a region of the superficial portion situated inward of the periphery of the p-type layer 73 by some distance. Thus, in the light receiving element 600, there is formed a fourth photodiode PD34 formed of a pn junction of the p-type layer 73 and the n-type layer 74 at a position closer to the light receiving surface than is the third photodiode PD33. The fourth photodiode PD34 (forth photoelectric conversion region) photoelectrically converts short wavelength light more efficiently than the third photodiode PD33 does.

The surface of each of the n-type layer 72, the p-type layer 73, and the n-type layer 74 is covered with a transparent protection film 75 made of $SiO_2$ or SiN. This protection film 75 has a third anode electrode 78, a third cathode electrode 77, a fourth anode electrode 80, and a fourth cathode electrode 79 formed thereon. The third cathode electrode 77 is connected to the n-type layer 72 through an opening formed in the protection film 75. The third anode electrode 78 is connected to the p-type layer 73 through another opening formed in the protection film 75. Here, the third anode electrode 78 and the third cathode electrode 77 are connected to each other by a wiring formed above the protection film 75. Moreover, the third anode electrode 78 is connected to a ground line (unillustrated), for example.

The fourth anode electrode 80 is connected to the p-type layer 73 through yet another opening formed in the protection film 75. The fourth cathode electrode 79 is connected to the n-type layer 74 through still another opening formed in the protection film 75. Moreover, the fourth anode electrode 80 is as well connected to a ground line (unillustrated), for example. Thus, a photoelectric current produced by photoelectric conversion in the fourth photodiode PD34 is outputted from the fourth cathode electrode 79 as a photodetection signal.

The protection film 75 has a transmissive film 76 formed thereon in such a manner as to cover a region extending from the third anode electrode 78 to the fourth anode electrode 80. The transmissive film 76 has the same function as the transmissive films shown in FIGS. 1 to 3, and is made of the same material. Moreover, the transmissive film 76 is formed in such a size as to cover the entire pn junction region of PD33 (third photoelectric conversion region). The transmissive film 76 is formed to have an area equal to or larger than the area of the pn junction region of PD33.

In the light receiving element 600, the third photodiode PD33 is shorted as the third anode electrode 78 and the third cathode electrode 77 are connected to each other. Accordingly, of photoelectric currents originating from light incident on the light receiving surface, the photoelectric current produced by photoelectric conversion in the third photodiode PD33 is released to the ground line, and only the photoelectric current produced by photoelectric conversion in the fourth photodiode PD34 is outputted from the fourth cathode electrode 79 as a photodetection signal.

In the light receiving element 600, the pn junction interface of the third photodiode PD33 and the pn junction interface of the fourth photodiode PD34 are formed at mutually different depths. Moreover, the pn junction interface of PD31 in the light receiving element 500 and the pn junction interface of PD33 in the light receiving element 600 are formed at mutually different depths. Furthermore, the pn junction interface of PD32 in the light receiving element 500 and the pn junction interface of PD34 in the light receiving element 600 are formed at the same depth.

The second and forth photodiodes PD32 and PD34 are each formed at such a depth that light in a wavelength range of for example 400 nm to 600 nm can be photoelectrically converted most efficiently. Moreover, the first and third photodiodes PD31 and PD33 are each formed at such a depth that light in a wavelength range of for example 600 nm to 800 nm can be photoelectrically converted most efficiently.

Figure 15:
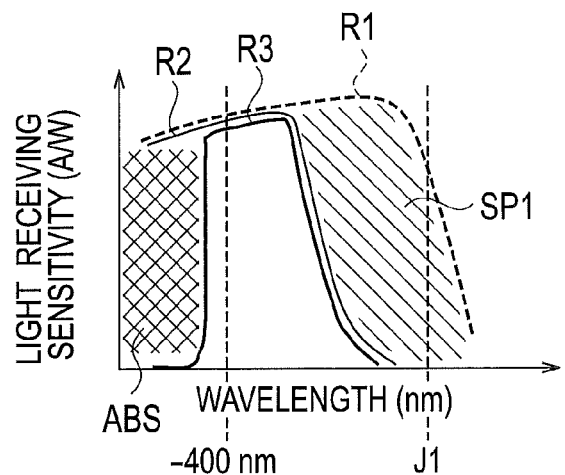
FIG. 15 is a graph showing how light in an ultraviolet range is detected using the structure in FIG. 14.

FIG. 15 shows light receiving sensitivity curves of the ultraviolet light detection device in FIG. 14. First, a light receiving sensitivity curve that is based on a detection signal obtained by applying light ranging from ultraviolet light to infrared light appears as R1 when the third photodiode PD33 is not shorted in the light receiving element 600. Here, J1 indicates a wavelength which varies depending on the depth of the pn junction interface of each of PD31 and PD33 and corresponds to a depth at which photoelectric conversion is done most efficiently.

An output SP1 on a long wavelength side disappears when the measurement is performed with the third photodiode PD33 shorted as in the configuration of the light receiving element 600. Thus, the sensitivity curve appears as R2. Next, in the case of the light receiving element 500, since the first photodiode PD31 is shorted, the application of the light ranging from ultraviolet light to infrared light provides a light receiving sensitivity curve that appears in the shape of R2 as in the case of the light receiving element 600. However, the sensitivity curve appears as R3 which is R2 with a sensitivity ABS in the ultraviolet range removed therefrom, because the ultraviolet light absorption semiconductor layer 66 absorbs the ultraviolet light substantially completely.

So, the light receiving sensitivity curve R3 can be obtained from the light receiving element 500, and the light receiving sensitivity curve R2 can be obtained from the light receiving element 600. Then, the sensitivity ABS in the ultraviolet range can be figured out by finding the difference between the light receiving sensitivity curves obtained from the respective light receiving elements 500 and 600; that is, ABS=(R2−R3). Through the above procedure, ultraviolet light can be detected.

Figure 16:
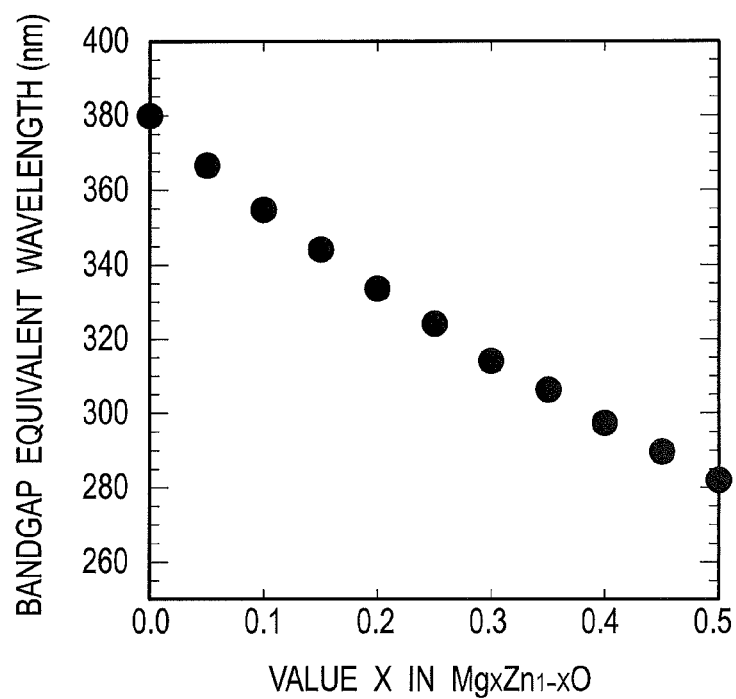
FIG. 16 is a graph showing the correlation between the bandgap equivalent wavelength and the Mg content in MgZnO.

FIG. 16 is a graph showing the correlation between the value of X in $Mg_XZn_{1-X}O$ and a bandgap equivalent wavelength (nm) relative to the Mg content in a case where $Mg_XZn_{1-X}O$ is used for the ultraviolet light absorption semiconductor layer. The bandgap equivalent wavelength is related to the absorption wavelength point (nm) of the semiconductor. The larger the value of X, the shorter the absorption wavelength of $Mg_XZn_{1-X}O$. As can be seen from the graph, the light receiving sensitivity range of the light receiving element can be changed by changing the Mg content X in $Mg_XZn_{1-X}O$.

Figure 17:
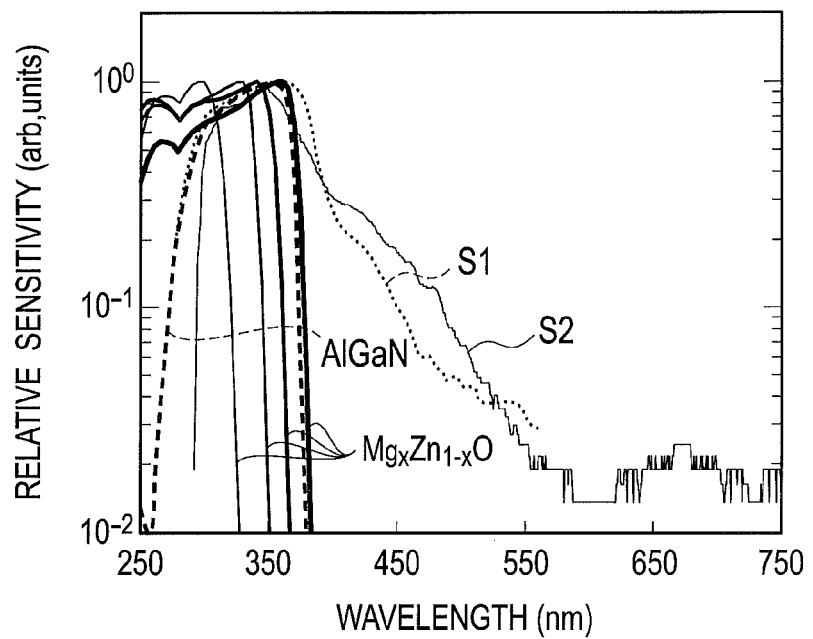
FIG. 17 is a graph showing sensitivity curves of cases where the Mg content in $Mg_XZn_{1-X}O$ serving as the ultraviolet light absorption semiconductor layer is varied, and of some other cases.

FIG. 17 is a graph showing: sensitivity curves of cases where the value of X in $Mg_XZn_{1-X}O$ serving as the ultraviolet light absorption semiconductor layer in the configuration of FIG. 1 is varied on the basis of the correlation in FIG. 16; and a sensitivity curve of a case where AlGaN is used for the ultraviolet light absorption semiconductor layer. As can be seen from FIG. 16, as the Mg content X increases, the bandgap equivalent wavelength becomes shorter, which in turn shifts the range of the light receiving sensitivity curve toward its shorter wavelength side and narrows the width of the sensitivity curve.

For this reason, multiple light receiving elements may be prepared in each of which the ultraviolet light absorption semiconductor layer uses $Mg_XZn_{1-X}O$ having a different Mg content X from those of the others. Moreover, a light receiving element may be prepared in which a transmissive film is formed instead of the ultraviolet light absorption semiconductor layer. Then, the difference between them may be figured out. In this way, it is possible to calculate the light receiving sensitivity in each of the wavelength ranges of the ultraviolet light A (above a wavelength of 320 nm but at or below 400 nm), the ultraviolet light B (above a wavelength of 280 nm but at or below 320 nm), and the ultraviolet light C (at or below a wavelength of 280 nm). S1 and S2 are spectral sensitivity curves obtained by setting mutually different depths for the pn junctions of the silicon photodiodes described in the conventional techniques, and subtracting a photoelectric current detected in one pn junction from that detected in the other. As illustrated, the light receiving sensitivity is significantly improved as compared to the conventional cases, and only ultraviolet light can be detected. Moreover, as can be seen from the graph, it is possible to use AlGaN or the like.

Next, optical filters of the present invention will be described. As shown in FIG. 20, commercially available photodiodes are used which are the same except for their optical filters 101A and 101B. Each of the photodiodes is a pn junction photodiode made of silicon (Si). In PD1, a p-type Si semiconductor 152 is formed on an n-type Si semiconductor 151, and the optical filter 101A is formed on the p-type Si semiconductor 152. On the other hand, in PD2, a p-type Si semiconductor 152 is formed on an n-type Si semiconductor 151, and the optical filter 101B is formed on the p-type Si semiconductor 152.

The optical filter 101A is formed by curing a paste substance. In the example of FIG. 20, a glass paste is used. The optical filter 101A made of the glass paste is configured to transmit ultraviolet light, visible light, infrared light, and the like and is of a material configured not to absorb light of any specific wavelength. On the other hand, the optical filter 101B is formed by curing a paste substance and is made of a glass paste in which semiconductor particles configured to absorb light of specific wavelengths are mixed. In the example of FIG. 20, in the optical filter 101B, ZnO particles are mixed in the glass paste. ZnO (zinc oxide) is a material that can play a role of an optical filter configured to absorb ultraviolet light and transmit light with longer wavelengths than that of the ultraviolet light.

Figure 18:
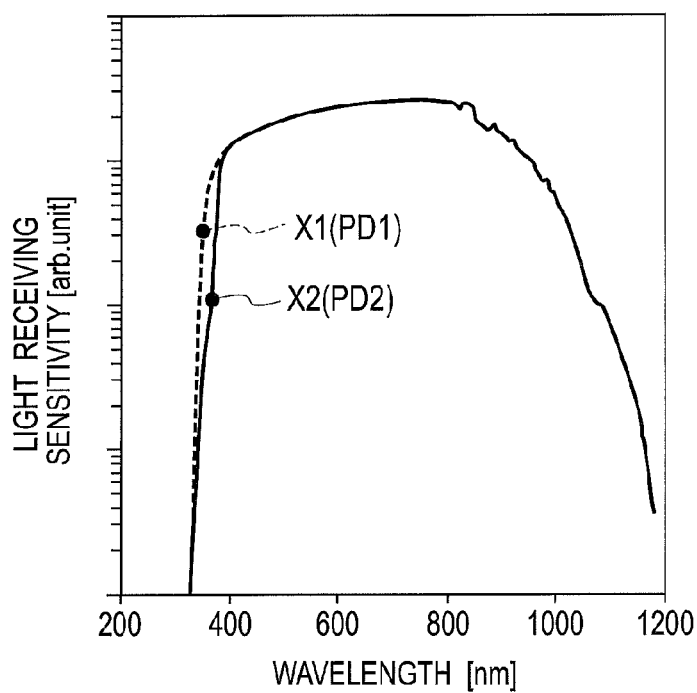
FIG. 18 is a graph showing characteristics of optical filters of the present invention.

PD1 and PD2 in FIG. 20 are irradiated with light including ultraviolet light from above, and their light receiving sensitivities are measured. The measurement results are shown in FIG. 18. FIG. 18 shows spectral sensitivity curves of PD1 and PD2. The horizontal axis in FIG. 18 represents the wavelength (nm) while the vertical axis in FIG. 18 represents the light receiving sensitivity. In general, light receiving sensitivity is expressed as the ratio between the amount of light (watt) incident on the element and the photoelectric current (ampere) flowing in the element. In FIG. 20, however, an arbitrary unit is employed by performing normalization using the highest sensitivity value or the like.

A curve denoted by X1 in FIG. 18 corresponds to the light receiving element PD1 while a curve denoted by X2 in FIG. 18 corresponds to the light receiving element PD2. As can be seen from the spectral sensitivity curves, in PD2, the optical filter 101B made of the glass paste containing ZnO absorbs ultraviolet light substantially completely, and therefore the sensitivity in the ultraviolet range is 0. On the other hand, in PD1, the optical filter 101A transmits the ultraviolet light and the pn junction portion of the photodiode receives the ultraviolet light, and therefore the light in the ultraviolet range is detected as a photoelectric current output.

Figure 19:
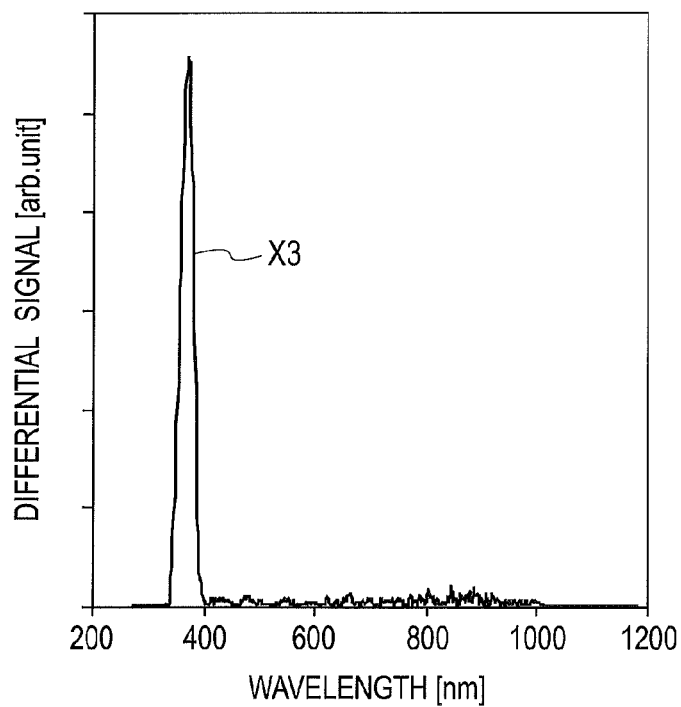
FIG. 19 is a graph showing characteristics of a differential signal of light receiving elements using the optical filters of the present invention.

Here, fluctuations attributable to interference fringes are not found in the light receiving sensitivity in either the curve X1 or X2. Thus, by subtracting the sensitivity curve X2 from the sensitivity curve X1, a sensitivity curve X3 shown in FIG. 19 is obtained as a differential signal; that is, X3=X1−X2. As can be seen from FIG. 19, the sensitivity curve X3 shows sensitivity in the ultraviolet light range and substantially 0 sensitivity in the other wavelength ranges. Moreover, a detection signal affected by interference fringes is not present.

To compare problems related to interference fringe, a light receiving element PD3 and a light receiving element PD4 in FIG. 21A each using the same photodiode as those in FIG. 20 are used, and their light receiving sensitivities are measured. No optical filter is formed on the photodiode of the light receiving element PD3, while an optical filter 153 made of a ZnO film formed by sputtering is formed on the photodiode of the light receiving element PD4. The measurement is performed by irradiating PD3 and PD4 with light including ultraviolet light from above.

Figure 22:
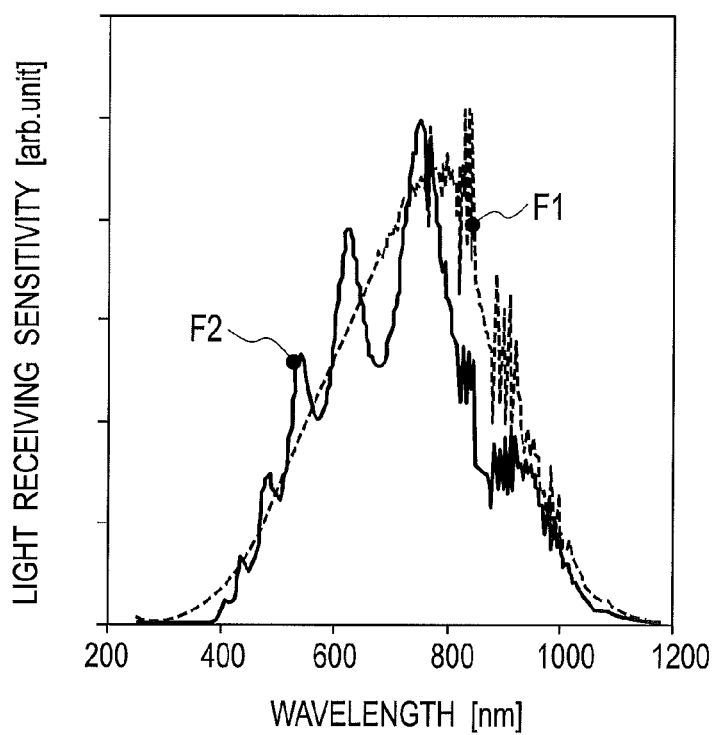
FIG. 22 is a graph showing results of measuring light receiving sensitivities from the configurations in FIG. 21A.

The measurement results are shown in FIG. 22. The horizontal axis in FIG. 22 represents the wavelength (nm) while the vertical axis in FIG. 22 represents the light receiving sensitivity (arbitrary unit). A curve (dotted line) denoted by F1 in FIG. 22 corresponds to the light receiving element PD3 while a curve (solid line) denoted by F2 in FIG. 22 corresponds to the light receiving element PD4. As can be seen from the spectral sensitivity curves, in PD3, ultraviolet light as well as light in the visible light range and infrared light range are all detected. Moreover, cyclic signal fluctuations which seem to originate from interference fringes are not present.

On the other hand, in PD4, the optical filter 153 made of a ZnO film absorbs the ultraviolet light substantially completely, and therefore the sensitivity in the ultraviolet range is 0. However, in the curve F2, cyclic fluctuations are found in the light receiving sensitivity spectrum over a wide range, implying an influence of interference fringes.

This can be explained using FIG. 21B. When incident on the optical filter 153 formed of a ZnO film, light including ultraviolet light generates a reflected wave at the boundary between the atmosphere and the optical filter 153. In addition, the light having entered the optical filter 153 generates a reflected wave at the interface between the optical filter 153 and the p-type Si semiconductor layer 152. These two reflected waves interfere with each other and cause an interference fringe. This interference fringe influences the spectral sensitivity characteristics. Interference fringe is generated at a certain cycle, and therefore the fluctuations appear in the spectral sensitivity curve cyclically as well. Thus, the sensitivity curve F2 waves in a shape corresponding to interference fringes.

Figure 23:
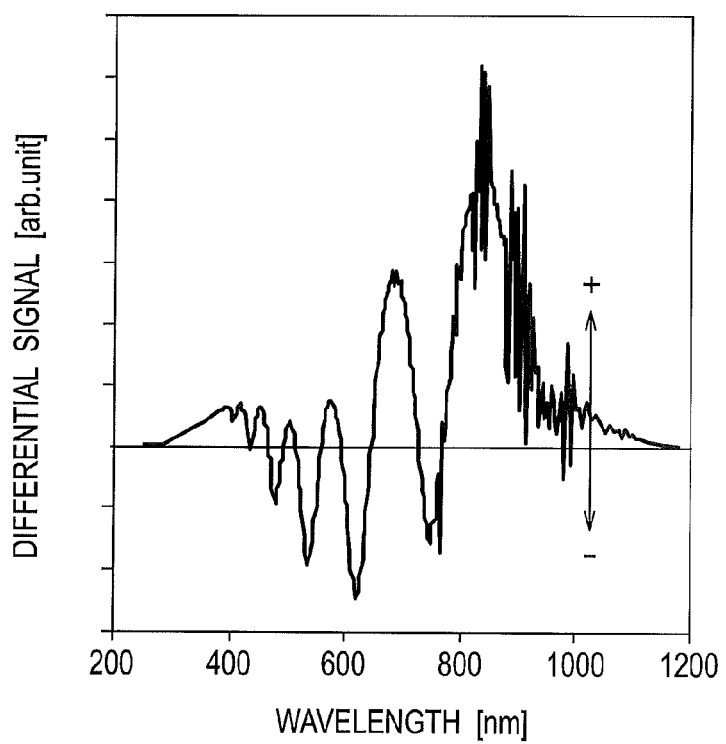
FIG. 23 is a graph showing a differential signal of the two sensitivity curves in FIG. 22.

FIG. 23 shows a sensitivity curve being a differential signal obtained by subtracting the curve F2 from the curve F1 (F1−F2). As can be seen from the differential signal, the curve swings in the positive and negative directions in phase with the cyclic fluctuations attributable to the interference fringes. Moreover, in FIG. 23, the signal fluctuating due to the interference fringes are significantly greater than the detection signal of the ultraviolet light. Thus, the ultraviolet light cannot be accurately detected at all.

Figure 24:
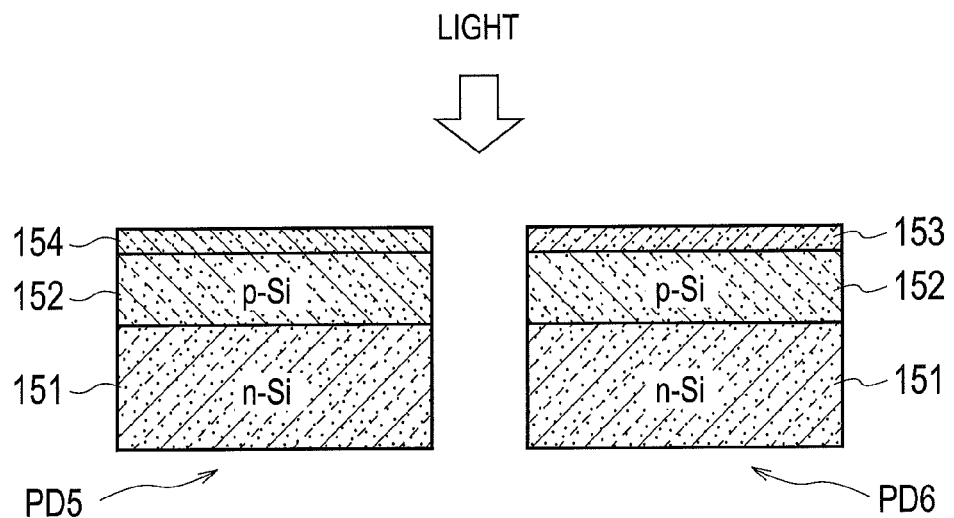
FIG. 24 is a cross-sectional view showing the configurations of two light receiving elements using conventional optical filters and having the same optical film thickness.

Next, a $ZrO_2$ film having the same optical film thickness as the optical filter 153 of the light receiving element PD4 in FIG. 21A is stacked as an optical filter 154 on the light receiving element PD3 in FIG. 21A, and their light receiving sensitivities are measured. Specifically, a light receiving element PD5 is used in which an optical filter 154 formed of a $ZrO_2$ film formed by sputtering is stacked on the photodiode as shown in FIG. 24. This $ZrO_2$ film is configured to transmit light ranging from ultraviolet light to visible light to infrared light. Meanwhile, PD6 is the same as PD4 in FIGS. 21A and 21B. Here, the optical film thickness is expressed as film thickness×refractive index. The optical filter 153 and the optical filter 154 are prepared such that $N1 \times T1 = n \times t$ can be satisfied, where N1 and T1 are the refractive index and film thickness of the optical filter 153 formed of the ZnO film, respectively, and n and t are the refractive index and film thickness of the optical filter 154 formed of the $ZrO_2$ film, respectively.

Figure 25:
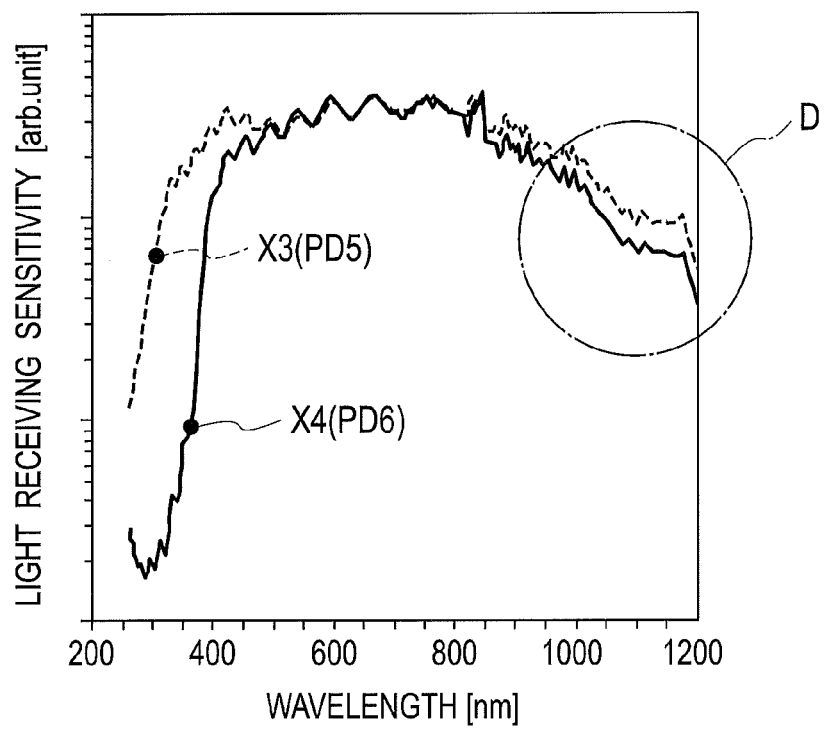
FIG. 25 is a graph showing results of measuring light receiving sensitivities from the configurations in FIG. 24.

DP5 and PD6 thus prepared are irradiated with light including ultraviolet light from above, and their light receiving sensitivities are measured. The measurement results are shown in FIG. 25. The horizontal axis in FIG. 25 represents the wavelength (nm) while the vertical axis in FIG. 25 represents the light receiving sensitivity (arbitrary unit). A curve (dotted line) denoted by X3 in FIG. 25 corresponds to the light receiving element PD5 while a curve (solid line) denoted by X4 in FIG. 25 corresponds to the light receiving element PD6. In PD5, ultraviolet light as well as light in the visible light range and infrared light range are all detected. On the other hand, in PD6, the ultraviolet light is absorbed, and therefore the sensitivity to the ultraviolet light is 0. Moreover, as can be seen from the spectral sensitivity curves, cyclic fluctuations due to interference fringes are present in both of the curves X3 and X4.

Since the optical filters 153 and 154 have the same optical film thickness, there is a similarity therebetween in the cycle and size of the fluctuations in the visible light range attributable to the interference fringes. However, in the infrared light range, there are gaps in the degree of the light receiving sensitivity between X3 and X4 as a range D shows, so that the sensitivities cannot match each other. This is because the wavelength dispersion of refractive index varies depending on the material from which the optical filter is prepared, and this makes it impossible to make the sensitivities match each other across all the wavelength ranges. For example, if interference fringes in a blue light range are to coincide with each other, there will be gaps in the sensitivity in the infrared light range.

Figure 26:
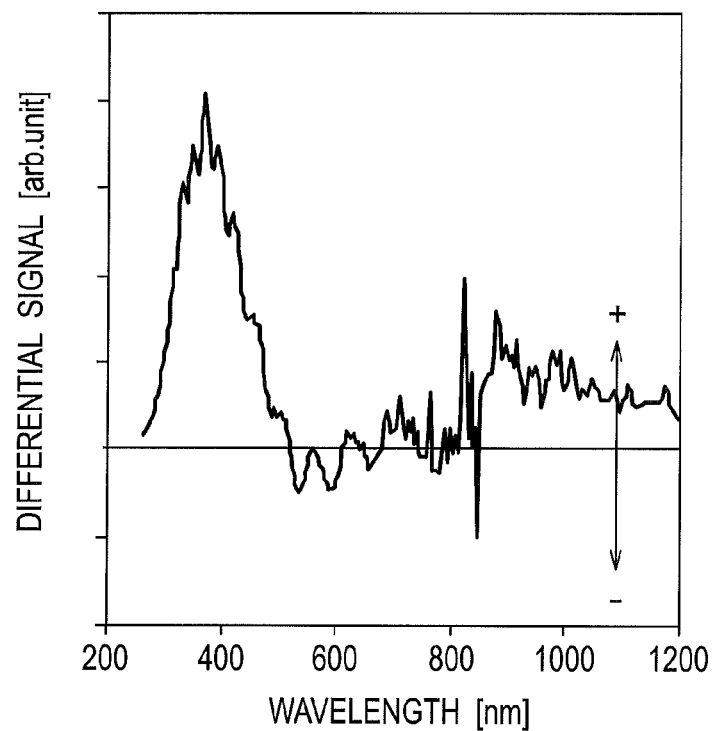
FIG. 26 is a graph showing a differential signal of the two sensitivity curves in FIG. 25.

FIG. 26 shows a sensitivity curve being a differential signal obtained by subtracting the curve X4 from the curve X3 (X3−X4). As can be seen from this differential signal, the detection signal appears relatively large in the ultraviolet light range, but the detection signal appears still large in the infrared light range. Thus, the ultraviolet light cannot be detected accurately.

As described above, using optical filters formed on photodiodes causes the above interference fringe problem and makes it difficult to detect light of specific wavelengths accurately. However, using the optical filters 101A and 101B in FIG. 20 makes it possible to obtain a signal completely free from noises attributable to interference fringes, as the signal in FIG. 19 shows. Accordingly, it is possible to detect light of specific wavelengths accurately with a high sensitivity.

To eliminate interference fringes, light scattering inside the optical filters is considered necessary. For this reason, optical filters obtained by curing a paste substance are used. A glass paste can be particularly easily formed into a thick film. Moreover, use of a paste substance permits the occurrence of light scattering and therefore prevents the generation of interference fringes. Meanwhile, the generation of interference fringes can be prevented even when ZnO powder is added to the paste substance. Also, it is desirable that scattering by ZnO be smaller than scattering by the glass paste.

Here, the paste substance may be any material as long as it transmits a wide range of light from ultraviolet light to infrared light. For example, it is possible to use an acrylic resin, an amorphous fluororesin (amorphous fluoropolymer), a silicone resin, a fluorine-based resin, a glass, or the like. It is particularly preferable that the paste substance have a thermal expansion coefficient close to those of the semiconductors or substrate on which the optical filters 101A and 101B are stacked, because such a configuration makes the paste substance less likely to be peeled off.

In addition, the optical filters 101A and 101B are preferably formed to have, but not particularly limited to, a film thickness of about 0.1 μm to 5 μm if there is a large difference in thermal expansion coefficient between the optical filters 101A and 101B and the semiconductors or substrate on which the optical filters 101A and 101B are stacked. Further, if the optical filters are to be formed by applying the paste substance on the semiconductors or substrate, a low-melting material is desirably used for the purpose of reducing damage on the semiconductors or substrate. From the viewpoint of thermal expansion coefficient and melting point, the major component of the paste is desirably a glass material, for example, as described above.

Moreover, one of the optical filters is prepared by curing a material having the paste substance as its major component and semiconductor particles added thereto. In this case, the semiconductor particles are undesirably a semiconductor powder having such a particle size as to whiten the paste substance when added thereto. This is because such a powder makes it difficult for the optical filter to transmit not only ultraviolet light but also visible light and the like, which in turn reduces the amount of light reaching the depletion layer formed at the interface between the p-type Si semiconductor 152 and the n-type Si semiconductor 151 and therefore makes the light detection impossible.

Next, a method of fabricating the optical filter 101B will be described. As the ZnO powder, 9 g of a ZnO powder having a particle size of 100 nm is used. As the major component of the paste, 85 g of a glass paste is used. 15 g of a dilution oil is mixed into the ZnO powder and the glass paste to thereby prepare a ZnO-powder-containing glass paste. The viscosity of this glass paste falls within a normal range and is 0.1 to 500000 mPas, for example. The dilution oil is used to adjust the viscosity, and the ratio of the dilution oil may be any ratio as long as a desired transmittance can be obtained eventually. The ZnO-powder-containing glass paste is screen-printed on the p-type Si semiconductor 152. As a result, the light receiving element PD2 is formed. As the method of forming the optical filter 101A or 101B, spin coating, dipping, or the like may be used to form the optical filter 101A or 101B, instead of the screen printing mentioned above.

Meanwhile, for the optical filter 101A, only the glass paste is screen-printed on the p-type Si semiconductor 152 so that the optical filter 101A would not contain the ZnO powder. Both of the optical filters 101A and 101B are prepared and burned in the same manner so as to provide them with the same transparency. This eliminates a difference in the optical transmittance involving scattering and thus eliminates a difference in the light receiving sensitivity.

The ultraviolet range here refers to a wavelength range from 400 nm down to about 200 nm. This ultraviolet range is further divided into the ultraviolet light A (above a wavelength of 320 nm but at or below 400 nm), the ultraviolet light B (above a wavelength of 280 nm but at or below 320 nm), and the ultraviolet light C (at or below a wavelength of 280 nm).

In a case where the glass paste is used as the major component of the paste substance as described above, the glass paste absorbs the wavelengths in the ranges of the ultraviolet light B and below, whereas the ZnO absorbs the wavelengths in the whole ultraviolet range. Thus, formed is a photodetection device which detects only the ultraviolet light A as shown in FIG. 19 by finding the difference between the light receiving elements PD 1 and PD2.

Figure 27:
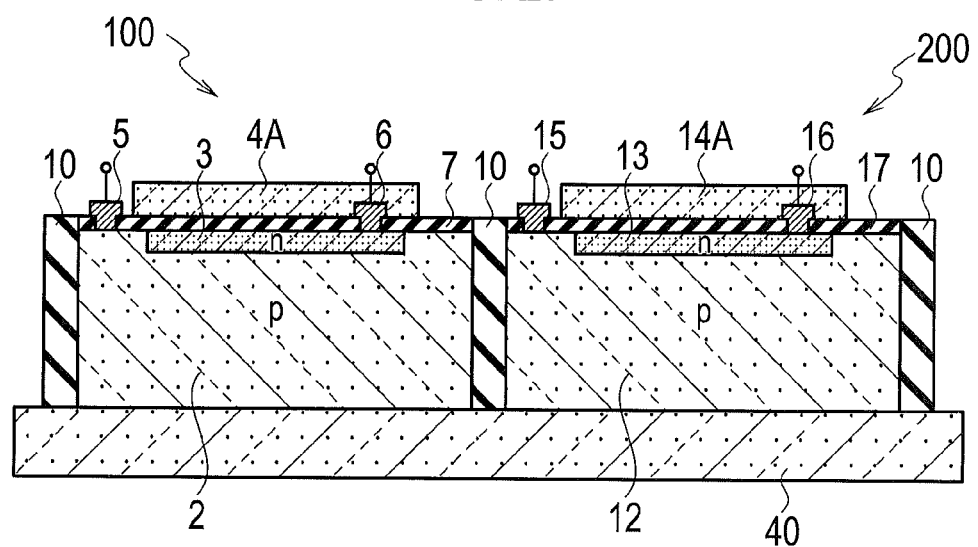
FIG. 27 is a cross-sectional view showing an example structure of a photodetection device using optical filters.

FIG. 27 shows an example where a photodetection device is configured using the optical filters described above. This photodetection device has basically the same structure as the photodetection device shown in FIG. 1. Since components in FIG. 27 denoted by the same reference signs as those in FIG. 1 have the same configurations, description thereof will be omitted. Note that a shared support substrate 40 plays the same role as the support substrate 1 in FIG. 1, and is made of silicon, for example.

The difference from FIG. 1 is that an optical filter 4A is formed on the protection film 7, and an optical filter 14A is formed on the protection film 17. The optical filter 4A is equivalent to a light absorption layer formed by curing a paste substance containing no semiconductor particles or a paste substance containing semiconductor particles, and configured to absorb light in a specific wavelength range. Alternatively, the optical filter 4A may be a dummy layer configured not to absorb light in any specific wavelength range. In one example, the optical filter 101A in FIG. 20 may serve as the optical filter 4A.

Moreover, the optical filter 4A provided on the light receiving surface side is formed in such a size as to cover the entire photoelectric conversion region A formed of the pn junction of the p-type layer 2 and the n-type layer 3. The optical filter 4A is formed to have an area equal to or larger than the area of the photoelectric conversion region A.

On the other hand, the optical filter 14A is equivalent to a light absorption layer formed by curing a paste substance containing no semiconductor particles or a paste substance containing semiconductor particles, and configured to absorb light in a specific wavelength range. Alternatively, the optical filter 14A may be a dummy layer configured not to absorb light in any specific wavelength range. In one example, the optical filter 101B in FIG. 20 may serve as the optical filter 14A.

Moreover, the optical filter 14A provided on the light receiving surface side is formed in such a size as to cover the entire photoelectric conversion region B formed of the pn junction of the p-type layer 12 and the n-type layer 13. The optical filter 14A is formed to have an area equal to or larger than the area of the photoelectric conversion region B.

A method of fabricating the photodetection device in FIG. 27 will be described. An example fabrication procedure will be described only briefly since the device can be created by using a widely known fabrication technique. An n-type silicon layer is formed on the support substrate 40. The surface (top surface) of the n-type silicon layer is oxidized to form an oxide coating $SiO_2$, which will become the protection films 7 and 17. Holes are bored through the oxide coating $SiO_2$, and p-type impurities are introduced therethrough by ion implantation or the like to create the p-type layers 2 and 12.

Next, additional holes are bored through the oxide coating $SiO_2$, and n-type impurities are introduced therethrough into the p-type layers 2 and 12 by ion implantation or the like to create the n-type layers 3 and 13. Meanwhile, the regions of the holes formed in the oxide coating $SiO_2$ will be the regions of the p- and n-type layers which the anode and cathode electrodes 5, 6, 15, and 16 will contact, respectively. Thus, contact regions are formed by ion implantation or the like so that the contact resistance can be reduced. Thereafter, middle portions and outer portions of the silicon layer are oxidized to create another oxide coating $SiO_2$ as the interlayer insulators 10. Next, the anode electrodes and the cathode electrodes are formed by sputtering or vapor deposition, and thereafter the optical filters 4A and 14A are formed. Lastly, wiring and the like are performed.

Figure 29:
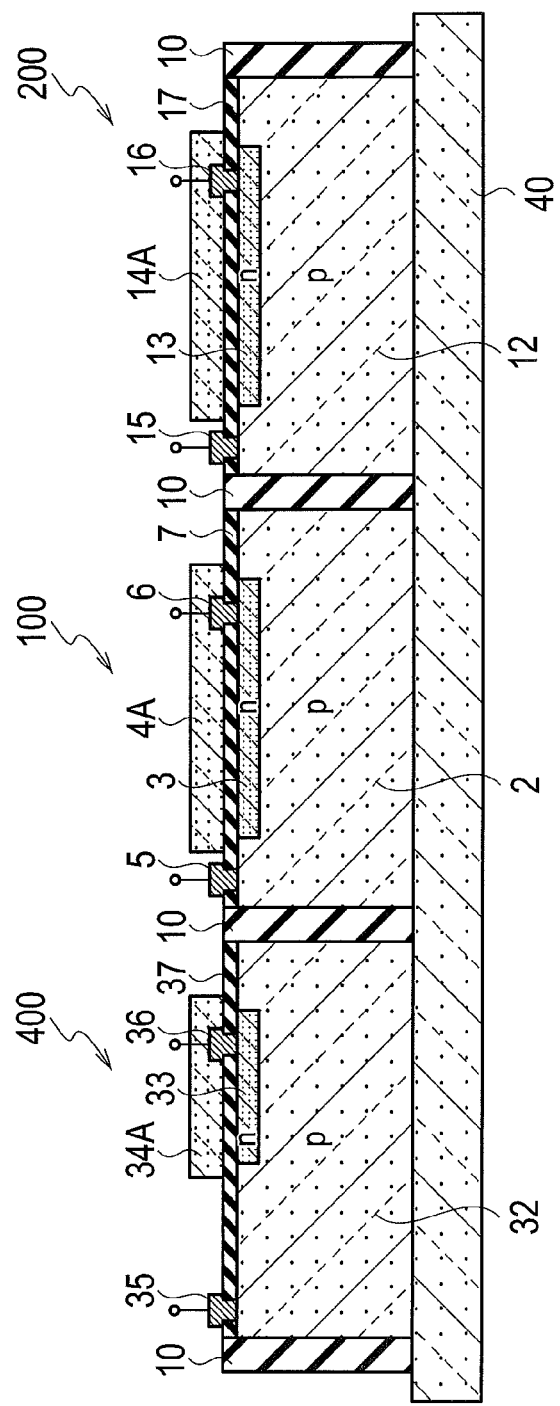
FIG. 29 is a cross-sectional view showing still another example structure of the photodetection device using optical filters.

Next, the photodetection device can be configured as shown in FIG. 29. In FIG. 29, a light receiving element 400 is formed additionally in the configuration of FIG. 27. This light receiving element 400 is formed to have the same structure as the light receiving element 100 but has a light receiving area different from the light receiving element 100. To briefly describe the light receiving element 400 serving as a photodetector, a p-type layer 32 is formed on the support substrate 40 with the interlayer insulator 10 as a boundary. The p-type layer 32 has an n-type layer 33 buried in its superficial portion. The n-type layer 33 is formed by doping n-type impurities through the surface of a region of the superficial portion situated inward of the periphery of the p-type layer 32 by some distance. Thus, in the light receiving element 400, there is formed a photoelectric conversion region D formed of a pn junction of the p-type layer 32 and the n-type layer 33. Light is converted into an electric current in this photoelectric conversion region D and outputted.

The surface of each of the p-type layer 32 and the n-type layer 33 is covered with a transparent protection film 37 made of $SiO_2$, SiN, or the like. In addition, the side surface of the p-type layer 32 is covered with the interlayer insulator 10. The protection film 37 has an anode electrode 35 and a cathode electrode 36 formed thereon. The anode electrode 35 is connected to the p-type layer 32 through an opening formed in the protection film 37. The cathode electrode 36 is connected to the n-type layer 33 through another opening formed in the protection film 37. Thus, a photoelectric current produced by photoelectric conversion in the pn junction region of the p-type layer 32 and the n-type layer 33 is outputted from the cathode electrode 36 as a photodetection signal. In addition, the protection film 37 has an optical filter 34A formed thereon in such a manner as to cover the cathode electrode 36.

The optical filter 34A is equivalent to a light absorption layer formed by curing a paste substance containing no semiconductor particles or a paste substance containing semiconductor particles, and configured to absorb light in a specific wavelength range. Moreover, the optical filter 34A is formed of a light absorption layer made of the same material as the optical filter 4A of the light receiving element 100 and configured to absorb light in a certain wavelength range $\lambda$ (a range from a lower-limit wavelength $\lambda L$ to an upper-limit wavelength $\lambda U$). This means that the optical filter 4A is likewise formed of the light absorption layer configured to absorb light in the wavelength range $\lambda$, (the range from the lower-limit wavelength $\lambda L$ to the upper-limit wavelength $\lambda U$).

On the other hand, the optical filter 14A of the light receiving element 200 is formed by curing a paste of an amorphous fluororesin or the like having a very high transmittance to not only ultraviolet light but also visible light to infrared light. Here, a range from ultraviolet light to infrared light (including visible light) assumes a wavelength range from 200 nm to 1200 nm as shown in FIG. 18 and the like.

The optical filter 34A is formed in such a size as to cover the entire photoelectric conversion region D formed of the pn junction of the p-type layer 32 and the n-type layer 33. The optical filter 34A is formed to have an area equal to or larger than the area of the photoelectric conversion region D. Here, the photoelectric conversion region D in the light receiving element 400 is formed to have a size (area) different from the size (area) of the photoelectric conversion region A in the light receiving element 100.

Let us assume that S1 is the area (light receiving area) of the photoelectric conversion region A in the light receiving element 100 and that S4 is the area (light receiving area) of the photoelectric conversion region D in the light receiving element 400. The light receiving area is the area of the pn junction interface in this embodiment. Based on a differential signal of the light receiving elements 100 and 400, a detection signal is measured for a wavelength range $\lambda 0$ which is a wavelength range of ultraviolet light to infrared light and excludes the wavelength range $\lambda$. In the light receiving elements 100 and 400, their respective optical filters 4A and 34A cut light in the wavelength range $\lambda$. Thus, the difference in detection photoelectric current between the light receiving elements 100 and 400 (I1–I4) is based on light in the wavelength range λ0 being the ultraviolet-infrared wavelength range excluding the wavelength range λ. When J0 is a photoelectric current induced per unit area upon incidence of light in the wavelength range λ0 on the light receiving area S1, J0 is likewise obtained for the light receiving area S4 of the light receiving element 400 and can be expressed as below:

$$(I1-I4)=(S1-S4)\times J0$$

(I1–I4) can be figured out through measurement and calculation. Moreover, the value of (S1–S4) can be figured since it is determined based on the design. Thus, J0 can be found easily. Once J0 is calculated, (J0×S2) is subtracted from (J2×S2) which is the amount of photoelectric current of the light receiving element 200 having no absorption range in the ultraviolet-infrared light range. Here, S2 is the light receiving area of the light receiving element 200, and J2 is a photoelectric current produced in the light receiving area S2 per unit area. Since J2 is a photoelectric current reflecting the result of detection of light including ultraviolet light, visible light, and infrared light, the above subtraction provides a difference that represents the amount of light in the wavelength range X0; that is, the amount of light in the wavelength range λ0={(J2×S2)−(J0×S2)}. S2 may be equal to S1. However, in order to prevent cancellation of significant digits of a numerical value in the subtraction computation as much as possible, the following measure may be taken. Multiple combinations of the light receiving elements 100, 200, and 400 are prepared which differ from one another in the light receiving areas of the light receiving elements including optical filters that absorb light in the wavelength range λ. An average value of the whole and deviations are calculated for each combination, and the amount of light in the wavelength range λ is finally calculated.

Figure 28:
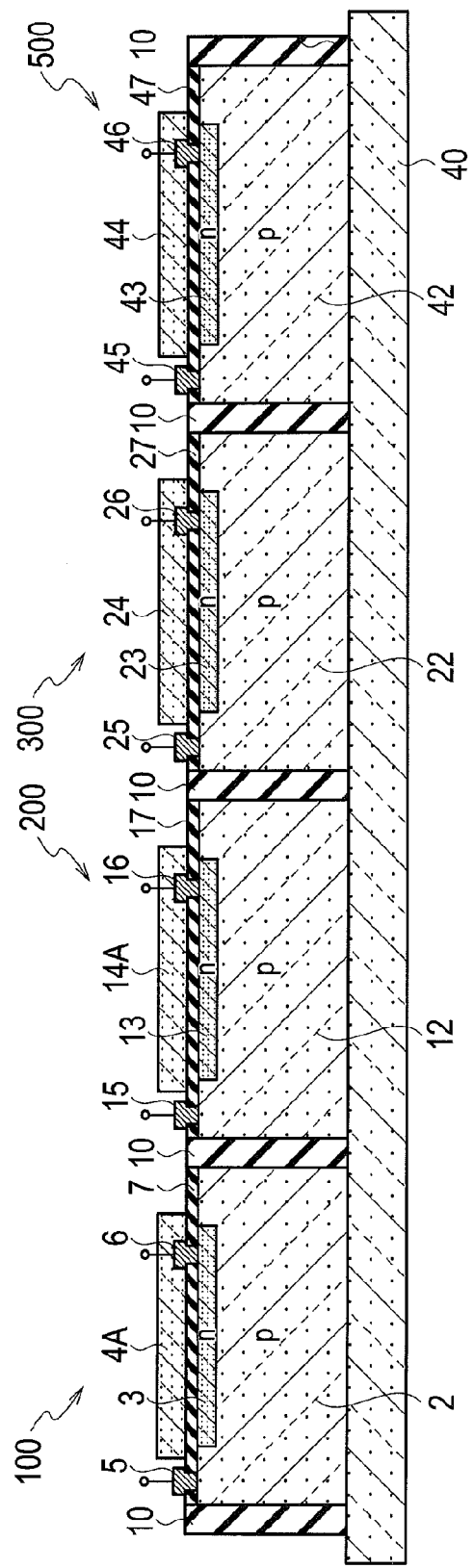
FIG. 28 is a cross-sectional view showing another example structure of the photodetection device using optical filters.

Next, the photodetection device can be configured as shown in FIG. 28. FIG. 28 shows a photodetection device configured by four light receiving elements obtained by adding, to the configuration in FIG. 27, light receiving elements 300 and 500 having the same structures as the light receiving elements 100 and 200. Note that optical filters 24 and 44 of the light receiving elements 300 and 500 are formed to have light absorption wavelength ranges different from those of the optical filters 4A and 14A of the light receiving elements 100 and 200.

To briefly describe the light receiving element 300 serving as a photodetector, a p-type layer 22 is formed on the support substrate 40 with the interlayer insulator 10 as a boundary. The p-type layer 22 has an n-type layer 23 buried in its superficial portion. The n-type layer 23 is formed by doping n-type impurities through the surface of a region of the superficial portion situated inward of the periphery of the p-type layer 22 by some distance. Thus, in the light receiving element 300, there is formed a photoelectric conversion region C formed of a pn junction of the p-type layer 22 and the n-type layer 23. Light is converted into an electric current in this photoelectric conversion region C and outputted.

The surface of each of the p-type layer 22 and the n-type layer 23 is covered with a transparent protection film 27 made of $SiO_2$, SiN, or the like. In addition, the side surface of the p-type layer 22 is covered with the interlayer insulator 10. The protection film 27 has an anode electrode 25 and a cathode electrode 26 formed thereon. The anode electrode 25 is connected to the p-type layer 22 through an opening formed in the protection film 27. The cathode electrode 26 is connected to the n-type layer 23 through another opening formed in the protection film 27. Thus, a photoelectric current produced by photoelectric conversion in the pn junction region of the p-type layer 22 and the n-type layer 23 is outputted from the cathode electrode 26 as a photodetection signal. In addition, the protection film 27 has the optical filter 24 formed thereon in such a manner as to cover the cathode electrode 26.

The optical filter 24 is equivalent to a light absorption layer formed by curing a paste substance containing no semiconductor particles or a paste substance containing semiconductor particles, and configured to absorb light in a specific wavelength range.

To briefly describe the light receiving element 500 serving as a photodetector, a p-type layer 42 is likewise formed on the support substrate 40 with the interlayer insulator 10 as a boundary. The p-type layer 42 has an n-type layer 43 buried in its superficial portion. The n-type layer 43 is formed by doping n-type impurities through the surface of a region of the superficial portion situated inward of the periphery of the p-type layer 42 by some distance. Thus, in the light receiving element 500, there is formed a photoelectric conversion region E formed of a pn junction of the p-type layer 42 and the n-type layer 43. Light is converted into an electric current in this photoelectric conversion region E and outputted.

The surface of each of the p-type layer 42 and the n-type layer 43 is covered with a transparent protection film 47 made of $SiO_2$, SiN, or the like. In addition, the side surface of the p-type layer 42 is covered with the interlayer insulator 10. The protection film 47 has an anode electrode 45 and a cathode electrode 46 formed thereon. The anode electrode 45 is connected to the p-type layer 42 through an opening formed in the protection film 47. The cathode electrode 46 is connected to the n-type layer 43 through another opening formed in the protection film 47. Thus, a photoelectric current produced by photoelectric conversion in the pn junction region of the p-type layer 42 and the n-type layer 43 is outputted from the cathode electrode 46 as a photodetection signal. In addition, the protection film 47 has the optical filter 44 formed thereon in such a manner as to cover the cathode electrode 46.

The optical filter 44 is equivalent to a light absorption layer formed by curing a paste substance containing no semiconductor particles or a paste substance containing semiconductor particles, and configured to absorb light in a specific wavelength range.

Here, the optical filters 4A, 14A, 24, and 44 are formed as below. The optical filter 4A is formed by curing a paste containing only an amorphous fluororesin (amorphous fluoropolymer). The optical filter 14A is formed by curing an amorphous fluororesin paste containing $Ga_2O_3$ particles. The optical filter 24 is formed by curing an amorphous fluororesin paste containing MgZnO particles. The optical filter 44 is formed by curing an amorphous fluororesin paste containing ZnO particles.

Figure 35:
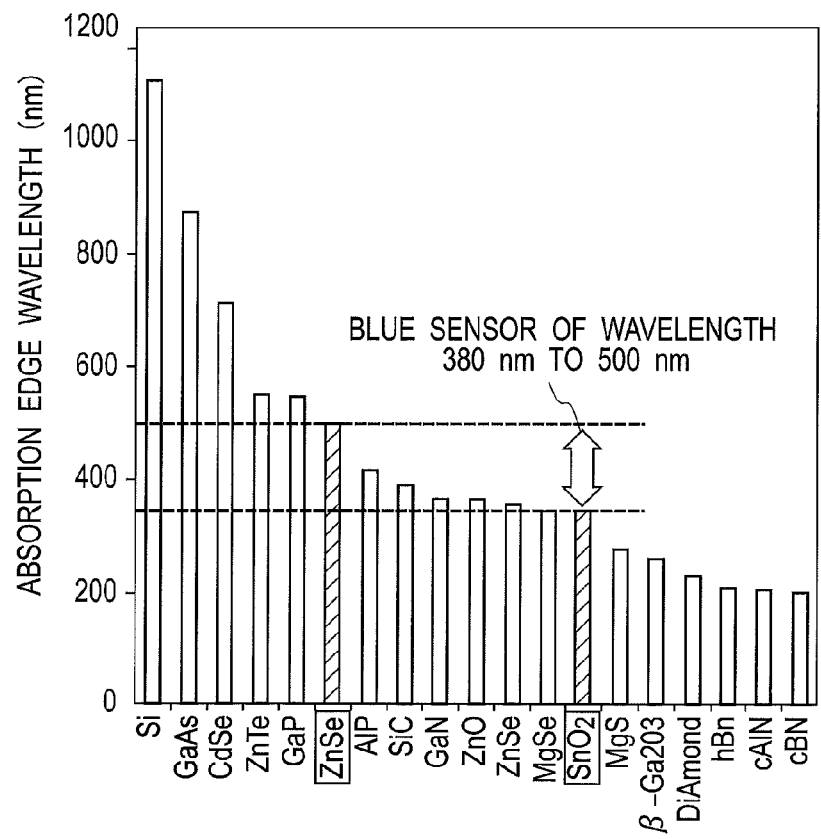
FIG. 35 is a graph showing kinds of semiconductors and the absorption edge wavelength of each semiconductor.

FIG. 35 shows the absorption edge wavelengths (nm) of semiconductor particles that can be used for the optical filters. The horizontal axis represents the kind of semiconductor element or compound to be added to the optical filters while the vertical axis represents the absorption edge wavelength, i.e. bandgap equivalent wavelength (nm). As can be seen from the graph, $Ga_2O_3$ absorbs the wavelengths of the ultraviolet light C (wavelengths of 280 nm and below). ZnO absorbs all the ultraviolet lights (ultraviolet lights A+B+C: 400 nm and below). Meanwhile, $Mg_XZn_{1-X}O$ ($0 \leq X < 1$) is known such that its absorption edge wavelength shifts toward the shorter wavelength side in the ultraviolet light range as the Mg content X increases. Thus, the light receiving sensitivity range of the light receiving element can be changed by changing the Mg content X in $Mg_XZn_{1-X}O$.

In this embodiment, X is set at 0.3, so that the optical filter 24 is made of an amorphous fluororesin containing particles of $Mg_{0.3}Zn_{0.7}O$ and absorbs the ultraviolet lights B and C (320 nm and below).

Figure 30:
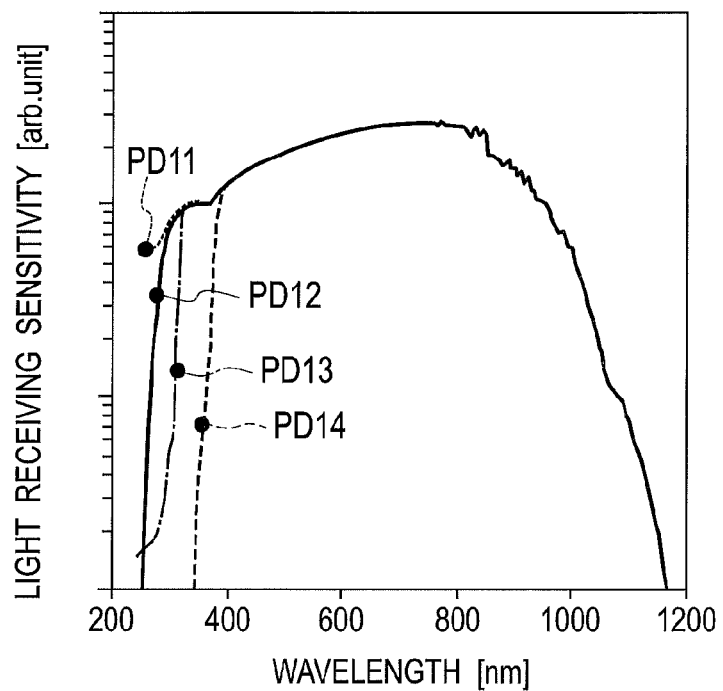
FIG. 30 is a graph showing sensitivity curves calculated by finding the difference between sensitivity curves of the configurations in FIG. 29.

Light of 200 nm to 1200 nm is applied from an upper side of the photodetection device in FIG. 28, and spectral sensitivities are measured. FIG. 30 shows light receiving sensitivity curves of the light receiving elements 100 (PD11), 200 (PD12), 300 (PD13), and 500 (PD14). The horizontal axis represents the wavelength (nm) while the vertical axis represents the light receiving sensitivity (arbitrary unit). The sensitivity curve PD11 shows sensitivity across the range from 200 nm to 1200 nm since the optical filter 4A of the light receiving element 100 transmits light ranging from ultraviolet light to infrared light. On the other hand, the sensitivity curve PD12 appears as a curve showing no sensitivity to the wavelengths of the ultraviolet light C since the optical filter 14A of the light receiving element 200 absorbs the wavelengths of the ultraviolet light C.

Meanwhile, the sensitivity curve PD13 appears as a curve showing no sensitivity to the wavelengths of the ultraviolet lights B and C since the optical filter 24 of the light receiving element 300 absorbs the wavelengths of the ultraviolet lights B and C. Moreover, the sensitivity curve PD 14 appears as a curve showing no sensitivity to almost all the ultraviolet lights since the optical filter 44 of the light receiving element 500 absorbs all the ultraviolet lights.

Figure 31:
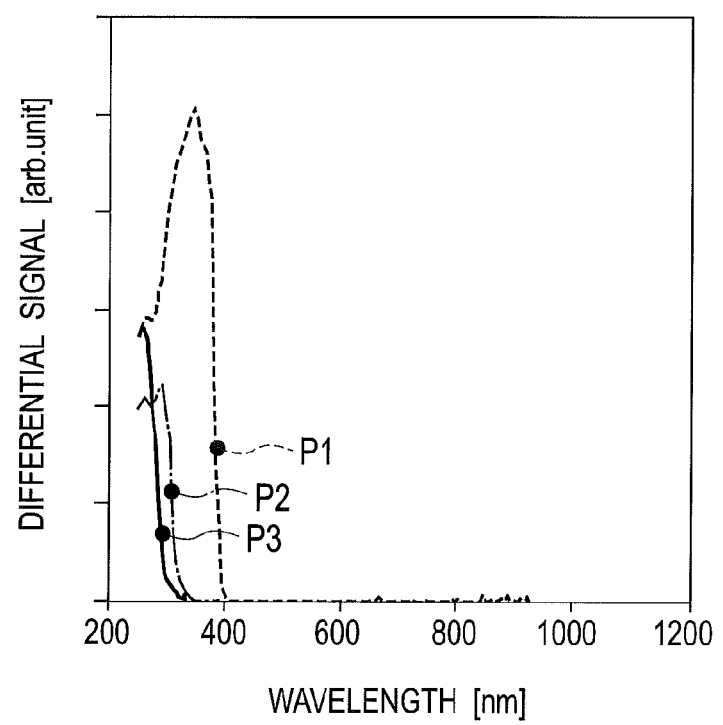
FIG. 31 is a graph showing differential signals obtained by respectively subtracting curves PD12 to PD14 in FIG. 30 from a curve PD11 in FIG. 30.
Figure 32:
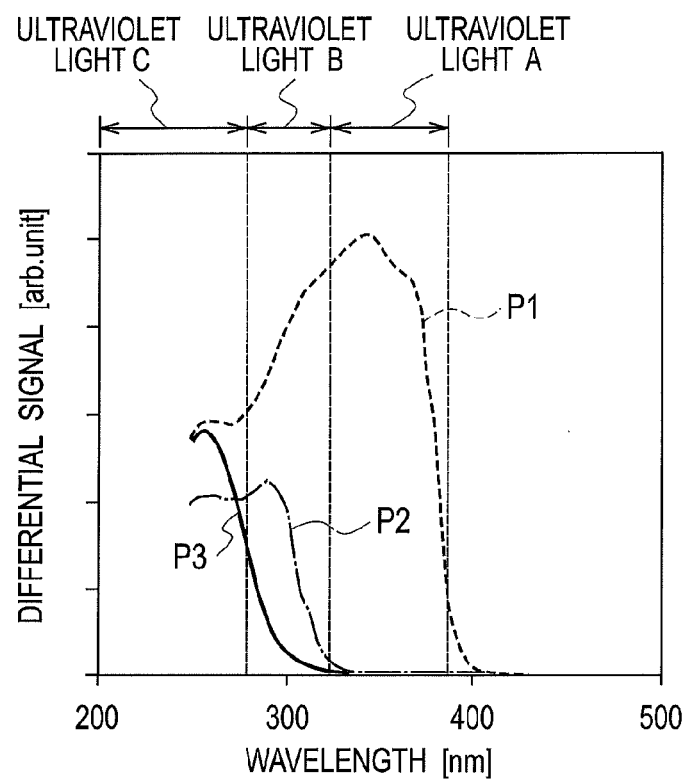
FIG. 32 is a stretched version of FIG. 31.

FIG. 31 shows signals corresponding to differences based on the sensitivity curves PD11, PD12, PD13, and PD14 in FIG. 30. The horizontal axis represents the wavelength (nm) while the vertical axis represents the differential signal (arbitrary unit). Moreover, FIG. 32 shows a stretched version of FIG. 31. As shown in FIGS. 31 and 32, sensitivity P3 to the ultraviolet light C can be figured out by finding the difference between the light receiving sensitivity curves of the light receiving elements 100 and 200; that is, P3=(PD11−PD12). Moreover, sensitivity P2 to the ultraviolet lights B and C can be figured out by finding the difference between the light receiving sensitivity curves of the light receiving elements 100 and 300; that is, P2=(PD11−PD13). Furthermore, sensitivity P1 to the ultraviolet lights A, B, and C can be figured out by finding the difference between the light receiving sensitivity curves of the light receiving elements 100 and 500; that is, P1=(PD11−PD14).

Figure 33:
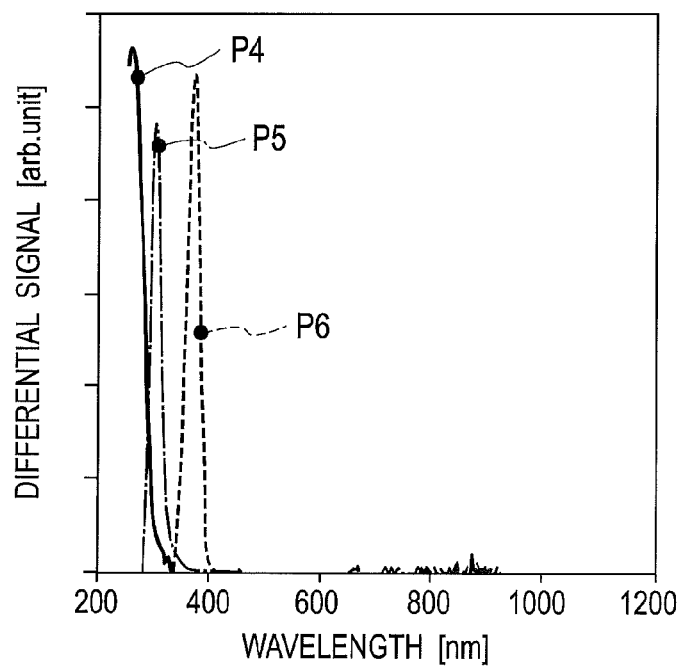
FIG. 33 is a graph showing curves obtained by finding the sensitivities to ranges of ultraviolet lights A, B, and C from the three differential signals in FIG. 31.
Figure 34:
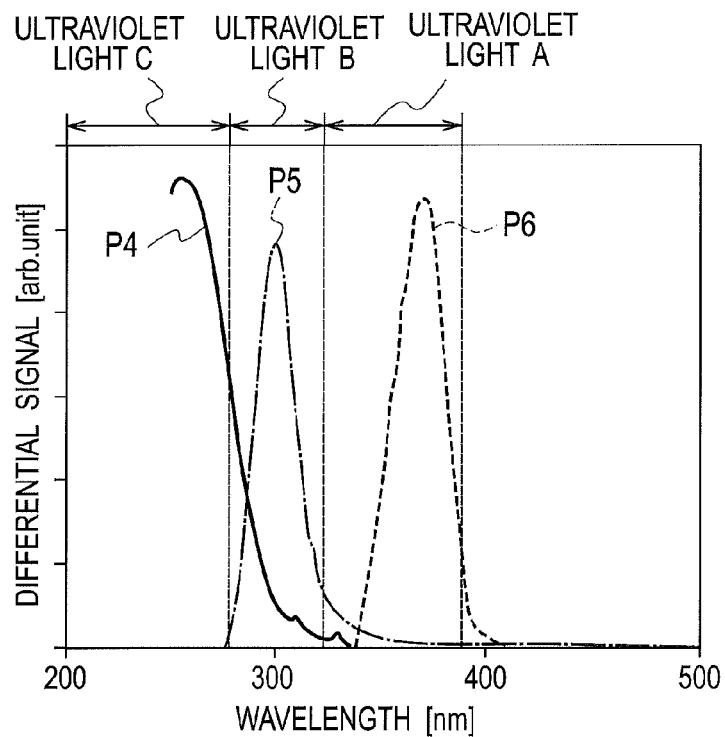
FIG. 34 is a stretched version of FIG. 33.

FIG. 33 shows that the differential signals P1, P2, and P3 in FIG. 31 are used to finally find only the sensitivity to each of the ranges of the ultraviolet lights A, B, and C. FIG. 34 is a stretched version of FIG. 33. Since the differential signal P3 in FIG. 31 shows sensitivity only to the ultraviolet light C, P3 is set equal to P4; that is, P4=(PD11−PD12). Thus, the sensitivity curve of the light receiving element 200 should be subtracted from the sensitivity curve of the light receiving element 100. To find the sensitivity only to the ultraviolet light B, the difference between P2 and P3 should be figured out; that is, the sensitivity curve P5 of the ultraviolet light B=(P2−P3)=(PD12−PD13). Thus, the sensitivity curve of the light receiving element 300 should be subtracted from the sensitivity curve of the light receiving element 200. Moreover, to find the sensitivity only to the ultraviolet light A, the difference between P1 and P2 should be figured out; that is, the sensitivity curve P6 of the ultraviolet light A=(P1−P2)=(PD13−PD14). Thus, the sensitivity curve of the light receiving element 500 should be subtracted from the sensitivity curve of the light receiving element 300.

By making pairs of light receiving elements out of the four light receiving elements and figuring out the difference between the sensitivity curves of each pair as described above, the sensitivities to the ranges of the ultraviolet lights A, B, and C can be detected individually.

In the above embodiment, the optical filters 4A, 14A, 24, and 44 are formed such that the sensitivities to the ranges of the ultraviolet lights A, B, and C can be detected individually. However, the present invention is not limited to this example, and the paste substance may be formed containing other kinds of semiconductor particles. FIG. 35 shows kinds of semiconductor particles that can be used for the optical filters. For example, in the configuration in FIG. 27, a filter with GaAs particles added thereto may be used as the optical filter 4A, and a filter with CdSe particles added thereto may be used as the optical filter 14A. In this case, formed is a photodetection device that is sensitive only to a range from 710 nm (absorption edge wavelength of CdSe) to 870 nm (absorption edge wavelength of GaAs).

In another example, in the configuration in FIG. 27, a filter with $SnO_2$ particles added thereto may be used as the optical filter 4A, and a filter with ZnSe particles added thereto may be used as the optical filter 14A. In this case, formed is a photodetection device that serves as a blue sensor sensitive only to a range from 380 nm (absorption edge wavelength of $SnO_2$) to 500 nm (absorption edge wavelength of ZnSe), as shown in FIG. 35.

Furthermore, like MgZnO and the like, a ternary mixed crystal system such as AlGaAs, InGaAs, or InGaN may be used, and the composition ratio may be adjusted to adjust the bandgap. In this way, it is possible to form a photodetection device capable of detecting light in a desired wavelength range. In addition to this, there is no need to use an interference filter such as a dielectric multilayer mirror, and therefore the optical filters can be prepared very easily.

As described above, for the semiconductor particles contained in the paste substance making up the optical filters, it is possible to use: a semiconductor of a group IV element; a compound semiconductor of a group II element and a group VI element; a compound semiconductor of a group III element and a group V element; a compound semiconductor of a group III element and a group VI element; or the like.

What is claimed is:

1. An optical filter containing:
a material having no light absorption range;
a dilution oil; and
semiconductor particles for absorbing light in a certain wavelength range.

2. The optical filter according to claim 1, wherein a first scattering by the semiconductor particles is smaller than a second scattering by the material having no light absorption range.

3. The optical filter according to claim 1, wherein the semiconductor particles are particles of any one of semiconductors of: a semiconductor of a group IV element; a compound semiconductor of a group II element and a group VI element; a compound semiconductor of a group III element and a group V element; a compound semiconductor of a group III element and a group VI element.

4. The optical filter according to claim 1, wherein the material having no light absorption range is composed of one or more of a glass material, an acrylic resin, a silicone resin, and an amorphous fluororesin.

5. The optical filter according to claim 1, wherein the optical filter is formed by curing a paste in which the material having no light absorption range and the semiconductor particles and the dilution oil are mixed.

6. The optical filter according to claim 2, wherein the material having no light absorption range is composed of one or more of a glass material, an acrylic resin, a silicone resin, and an amorphous fluororesin.

7. The optical filter according to claim 4, wherein the optical filter is formed by curing a paste in which the material having no light absorption range and the semiconductor particles and the dilution oil are mixed.

* * * * *